(12) United States Patent　　(10) Patent No.: US 12,574,977 B2
Yi　　(45) Date of Patent: Mar. 10, 2026

(54) PACKET TRANSMISSION METHOD FOR ELECTRONIC DEVICE POSITIONING SERVICE AND APPARATUS THEREOF

(71) Applicant: SAMSUNG ELECTRONICS CO., LTD., Suwon-si (KR)

(72) Inventor: Sungjun Yi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 387 days.

(21) Appl. No.: 18/106,797

(22) Filed: Feb. 7, 2023

(65) Prior Publication Data

US 2023/0189357 A1　　Jun. 15, 2023

Related U.S. Application Data

(63) Continuation of application No. PCT/KR2021/010238, filed on Aug. 4, 2021.

(30) Foreign Application Priority Data

Aug. 7, 2020　(KR) ........................ 10-2020-0099433
Dec. 2, 2020　(KR) ........................ 10-2020-0166797

(51) Int. Cl.
　H04W 4/00　　(2018.01)
　H04W 12/0431　　(2021.01)
　　　　(Continued)

(52) U.S. Cl.
　CPC ....... H04W 76/10 (2018.02); H04W 12/0431 (2021.01); H04W 12/06 (2013.01)

(58) Field of Classification Search
　CPC . H04W 76/10; H04W 12/0431; H04W 12/06; H04W 12/02; H04W 12/041;
　　　　(Continued)

(56) References Cited

U.S. PATENT DOCUMENTS 8,051,489 B1 * 11/2011 Montenegro ......... H04L 63/065
　　　　　　　　　　　　　　　　　　726/29
8,412,949 B2 * 4/2013 Giobbi .................... G06F 21/32
　　　　　　　　　　　　　　　　　　713/169
(Continued)

FOREIGN PATENT DOCUMENTS

CN　　105450269 A　　3/2016
JP　　2008-85788 A　　4/2008
(Continued)

OTHER PUBLICATIONS

Communication issued Mar. 25, 2025 by the Korean Intellectual Property Office in Korean Patent Application No. 10-2020-0166797.
(Continued)

*Primary Examiner* — Stephen M D Agosta
(74) *Attorney, Agent, or Firm* — Sughrue Mion, PLLC

(57)　　ABSTRACT

An electronic device includes: a wireless communication circuit; at least one processor; and a memory configured to store data acquired from a first external device and operatively connected to the at least one processor. The memory stores instructions which, when executed, cause the at least one processor to: establish a wireless connection with the first external device and receive a first signal from the first external device through the wireless connection. The first signal includes a shared key registered in a server in connection with the electronic device, seed information assigned to the electronic device by the server, and first time information indicating a reference time of the server; generate an advertising packet including at least one of a privacy Identification (ID), an aging counter, and signature information based on the first signal; and broadcast the generated advertising packet.

11 Claims, 13 Drawing Sheets

(51) Int. Cl.
*H04W 12/06* (2021.01)
*H04W 76/10* (2018.01)

(58) Field of Classification Search
CPC . H04W 12/10; H04W 12/106; H04W 12/108;
H04W 12/61; H04W 12/50; G06K 19/07;
G06K 19/077; H04L 1/00
See application file for complete search history.

(56) References Cited

U.S. PATENT DOCUMENTS

| | | | |
|---|---|---|---|
| 9,129,283 B1* | 9/2015 | Raju | G06F 21/6209 |
| 9,332,081 B2* | 5/2016 | Gatto | H04L 67/535 |
| 9,392,453 B2* | 7/2016 | Zhang | H04L 9/3297 |
| 9,450,928 B2* | 9/2016 | Broustis | H04L 9/3271 |
| 9,503,856 B2* | 11/2016 | Cherian | H04W 64/00 |
| 9,510,195 B2* | 11/2016 | Perier | H04L 12/2825 |
| 9,635,014 B2* | 4/2017 | Venkataraman | H04L 63/0815 |
| 9,730,619 B2 | 8/2017 | Messenger et al. | |
| 9,900,733 B2* | 2/2018 | Beattie, Jr. | H04W 4/02 |
| 10,021,516 B2 | 7/2018 | Farley et al. | |
| 10,212,187 B2 | 2/2019 | Kaushik | |
| 10,219,106 B1 | 2/2019 | Lam et al. | |
| 10,827,333 B1* | 11/2020 | Murali | H04W 12/04 |
| 11,128,437 B1* | 9/2021 | Nossik | H04L 9/0637 |
| 11,330,428 B2* | 5/2022 | Jost | H04W 12/72 |
| 11,502,853 B2* | 11/2022 | Don | H04L 9/0825 |
| 2004/0054920 A1* | 3/2004 | Wilson | H04L 63/0428 |
| | | | 726/7 |
| 2006/0218604 A1* | 9/2006 | Riedl | H04N 21/8358 |
| | | | 348/E7.071 |
| 2007/0100701 A1 | 5/2007 | Boccon-Gibod et al. | |
| 2007/0186105 A1* | 8/2007 | Bailey | H04L 63/0492 |
| | | | 713/168 |
| 2007/0260888 A1* | 11/2007 | Giobbi | G06F 21/32 |
| | | | 713/186 |
| 2008/0090558 A1* | 4/2008 | Nagata | H04M 1/72457 |
| | | | 455/414.2 |
| 2008/0092181 A1* | 4/2008 | Britt | H04N 21/482 |
| | | | 348/E7.071 |
| 2013/0231130 A1* | 9/2013 | Cherian | H04W 4/025 |
| | | | 455/456.1 |
| 2015/0229654 A1* | 8/2015 | Perier | H04W 12/03 |
| | | | 726/3 |
| 2015/0244711 A1* | 8/2015 | Venkataraman | H04L 63/0815 |
| | | | 713/168 |
| 2015/0350906 A1* | 12/2015 | Patil | H04W 12/04 |
| | | | 713/168 |
| 2016/0036854 A1* | 2/2016 | Himawan | H04L 63/04 |
| | | | 726/5 |
| 2016/0099936 A1* | 4/2016 | Enke | H04W 4/80 |
| | | | 726/7 |

| | | | |
|---|---|---|---|
| 2016/0125416 A1* | 5/2016 | Spencer | G06Q 20/3829 |
| | | | 705/71 |
| 2016/0269374 A1* | 9/2016 | Smith | H04L 63/0435 |
| 2016/0283933 A1* | 9/2016 | Orlando | G06Q 20/204 |
| 2016/0309323 A1* | 10/2016 | Zarakas | G06Q 20/3829 |
| 2017/0118645 A1* | 4/2017 | Zarakas | G06Q 20/3829 |
| 2017/0180130 A1* | 6/2017 | Martin | H04L 63/08 |
| 2017/0187530 A1* | 6/2017 | Ghosh | G09C 1/00 |
| 2017/0201886 A1 | 7/2017 | Yang et al. | |
| 2017/0257760 A1* | 9/2017 | Moran | H04W 4/023 |
| 2017/0288867 A1* | 10/2017 | Collier | G06F 21/602 |
| 2018/0083955 A1* | 3/2018 | Tuli | H04L 63/0861 |
| 2018/0114012 A1* | 4/2018 | Sood | G06F 21/79 |
| 2018/0176202 A1* | 6/2018 | Ro | H04L 63/0428 |
| 2018/0343561 A1 | 11/2018 | Patterson | |
| 2019/0089546 A1* | 3/2019 | Garcia Morchon | H04L 9/0847 |
| 2019/0141474 A1 | 5/2019 | de la Broise | |
| 2019/0261168 A1* | 8/2019 | Shi | H04W 12/35 |
| 2019/0356485 A1 | 11/2019 | Young et al. | |
| 2020/0076588 A1 | 3/2020 | Jeon | |
| 2020/0107164 A1* | 4/2020 | Lopatin | G01S 5/0284 |
| 2020/0252787 A1* | 8/2020 | Kwok | H04L 63/0414 |
| 2020/0396681 A1* | 12/2020 | Murali | H04L 9/0825 |
| 2021/0126939 A1* | 4/2021 | Sullivan | G06Q 20/3825 |
| 2021/0127245 A1* | 4/2021 | Park | H04W 12/50 |
| 2022/0070971 A1* | 3/2022 | Wang | H04W 48/08 |
| 2022/0201429 A1* | 6/2022 | Schoenberg | H04W 52/0229 |
| 2022/0345871 A1* | 10/2022 | An | H04W 4/60 |
| 2023/0199866 A1* | 6/2023 | Chung | H04L 63/0442 |
| | | | 370/328 |

FOREIGN PATENT DOCUMENTS

| | | |
|---|---|---|
| KR | 10-2004-0001374 A | 1/2004 |
| KR | 10-2012-0092155 A | 8/2012 |
| KR | 10-2014-0138846 A | 12/2014 |
| KR | 10-2015-0142436 A | 12/2015 |
| KR | 10-1624341 B1 | 5/2016 |
| KR | 10-1809974 B1 | 12/2017 |
| KR | 10-2018-0071514 A | 6/2018 |
| WO | 2020/086987 A1 | 4/2020 |

OTHER PUBLICATIONS

International Search Report (PCT/ISA/210) dated Dec. 6, 2021 issued in International Application No. PCT/KR2021/010238.
Written Opinion (PCT/ISA/237) dated Dec. 6, 2021 issued in International Application No. PCT/KR2021/010238.
Communication issued Dec. 18, 2024 by the Korean Intellectual Property Office in Korean Patent Application No. 10-2020-0166797.

* cited by examiner

PACKET TRANSMISSION METHOD FOR ELECTRONIC DEVICE POSITIONING SERVICE AND APPARATUS THEREOF

CROSS-REFERENCE TO RELATED APPLICATIONS

This application is a by-pass continuation application of International Application No. PCT/KR2021/010238, filed on Aug. 4, 2021, which is based on and claims priority to Korean Patent Application No. 10-2020-0099433, filed on Aug. 7, 2020, and Korean Patent Application No. 10-2020-0166797, filed on Dec. 2, 2022, in the Korean Intellectual Property Office, the disclosures of which are incorporated by reference herein in their entireties.

BACKGROUND

1. Field

One or more embodiments disclosed in the present disclosure relate to a technology for generating and transmitting a packet for an electronic device positioning service.

2. Description of Related Art

With the recent increase in the supplying of various electronic products, in addition to a mobile communication device such as a smartphone, a plurality of electronic devices such as a smart watch, an earphone, and a tablet are used in connection with the smartphone. A small-sized electronic device such as wireless earbuds is at risk of being lost due to a user's carelessness. A manufacturer or a service provider may provide, in preparation of such loss, a service for identifying the location of the lost electronic device.

A positioning service for an electronic device is performed by using a method in which, when an electronic device subject to positioning broadcasts a signal including identification information to notify of the existence of the electronic device itself, nearby mobile devices scan the signal and register the scanned signal together with positioning information in a predetermined server. In this process, the signal broadcast by the electronic device may be wrongfully falsified by a random user and false information is registered in a server, or may be eavesdropped or stolen by a user having malicious intent, resulting in unwanted location tracking.

In general, a positioning service for an electronic device may be performed in a manner in which an electronic device subject to positioning broadcasts a signal including identification information of the electronic device itself, and nearby other mobile devices having received the signal provide location information of the corresponding point to a predetermined server. In this process, when the signal broadcast by the electronic device does not change for a long period of time, a nearby user who eavesdrops on the signal may randomly track the location of the electronic device. In addition, a signal generated by the conventional method includes a hash value calculated based on unique identification information of an electronic device and a count managed by the electronic device. According to the relevant hash method, a plurality of electronic devices may use the same value as identification information, and thus it is difficult to distinguish between electronic devices, and the existing count value is vulnerable to illegal falsification.

SUMMARY

Provided are one or more embodiments relating to signal generation and broadcasting to prevent illegal falsification of a signal and illegal location tracking from occurring in the process of providing a positioning service for an electronic device.

According to an aspect of the present disclosure, an electronic device includes: a wireless communication circuit: at least one processor; and a memory configured to store data acquired from a first external device and operatively connected to the at least one processor. The memory stores instructions which, when executed, cause the at least one processor to: establish a wireless connection with the first external device and receive a first signal from the first external device through the wireless connection. The first signal includes a shared key registered in a server in connection with the electronic device, seed information assigned to the electronic device by the server, and first time information indicating a reference time of the server. The instructions further cause the at least one processor to generate an advertising packet including at least one of a privacy Identification (ID), an aging counter, and signature information based on the first signal and broadcast the generated advertising packet.

According to another aspect of the present disclosure, a method performed by an electronic device includes: establishing a wireless connection with a first external device: receiving a first signal from the first external device through the wireless connection. The first signal includes a shared key which is registered in a server in connection with the electronic device, seed information assigned to the electronic device by the server, and first time information indicating a reference time of the server. The method further includes generating an advertising packet including at least one of a privacy ID, an aging counter, and signature information based on the first signal and broadcasting the generated advertising packet.

According to one or more embodiments disclosed in the present disclosure, some data of a packet broadcast by an electronic device subject to positioning are changed at a designated time period, so as to prevent illegal copying or falsification of the packet and prepare in advance against spoofing and/or attack risks that may occur in the process of providing a positioning service. In addition, various effects directly or indirectly identified through the present disclosure may be provided.

BRIEF DESCRIPTION OF THE DRAWINGS

The above and other aspects, features, and advantages of certain embodiments of the present disclosure will be more apparent from the following description taken in conjunction with the accompanying drawings, in which.

In connection with the description of the drawings, the same or similar reference numerals may be used for the same or similar elements.

DETAILED DESCRIPTION

Hereinafter, one or more embodiments disclosed in the present disclosure will be described with reference to the accompanying drawings. This is not intended to limit the one or more embodiments of the disclosure to a specific form, and should be understood to include various modifications, equivalents, and/or alternatives of the disclosure.

Figure 1:
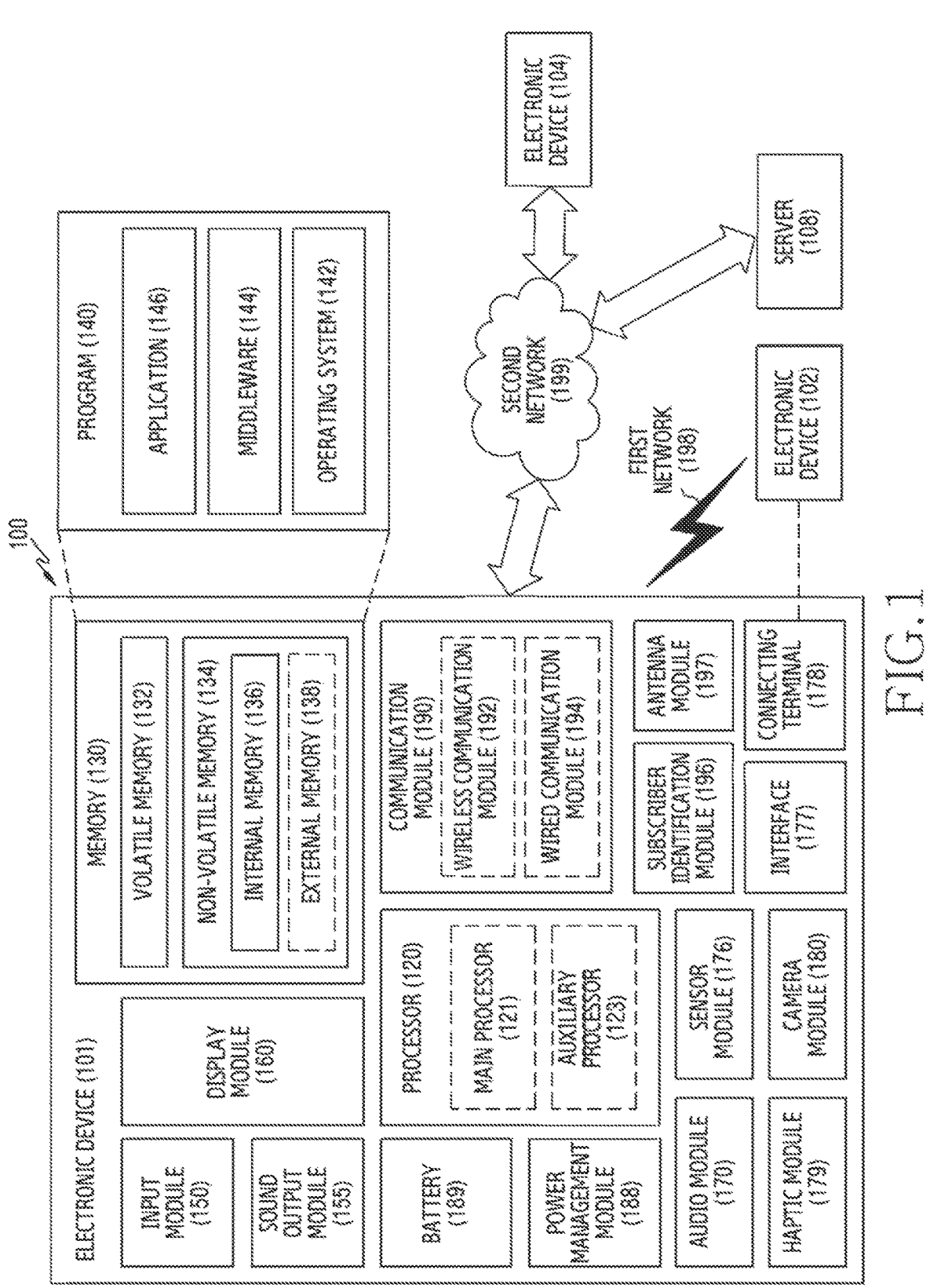
FIG. 1 illustrates an electronic device in a network environment according to an embodiment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a Subscriber Identification Module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a Central Processing Unit (CPU) or an Application Processor (AP)), or an auxiliary processor 123 (e.g., a Graphics Processing Unit (GPU), a Neural Processing Unit (NPU), an Image Signal Processor (ISP), a sensor hub processor, or a Communication Processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a Deep Neural Network (DNN), a Convolutional Neural Network (CNN), a Recurrent Neural Network (RNN), a Restricted Boltzmann Machine (RBM), a Deep Belief Network (DBN), a Bidirectional Recurrent Deep Neural Network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an Operating System (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a High Definition Multimedia Interface (HDMI), a Universal Serial Bus (USB) interface, a Secure Digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a Power Management Integrated Circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the Application Processor (AP)) and supports a direct (e.g., wired) communication or a wireless communication. According to an embodiment, the communication module 190 may include a wireless communication module 192 (e.g., a cellular communication module, a short-range wireless communication module, or a Global Navigation Satellite System (GNSS) communication module) or a wired communication module 194 (e.g., a Local Area Network (LAN) communication module or a Power Line Communication (PLC) module). A corresponding one of these communication modules may communicate with the external electronic device via the first network 198 (e.g., a short-range communication network, such as Bluetooth™, Wireless-Fidelity (Wi-Fi) direct, or Infrared Data Association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., International Mobile Subscriber Identity (IMSI)) stored in the SIM 196.

The wireless communication module 192 may support a 5G network, after a 4G network, and next-generation communication technology, e.g., New Radio (NR) access technology. The NR access technology may support enhanced Mobile Broadband (eMBB), massive Machine Type Communications (mMTC), or Ultra-Reliable And Low-Latency Communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of Ims or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a Printed Circuit Board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a Radio Frequency Integrated Circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, General Purpose Input And Output (GPIO), Serial Peripheral Interface (SPI), or Mobile Industry Processor Interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, Mobile Edge Computing (MEC), or client-server computing technology may be used, for example. The electronic device 101 may provide ultra low-latency services using, e.g., distributed computing or mobile edge computing. In another embodiment, the external electronic device 104 may include an Internet-of-Things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
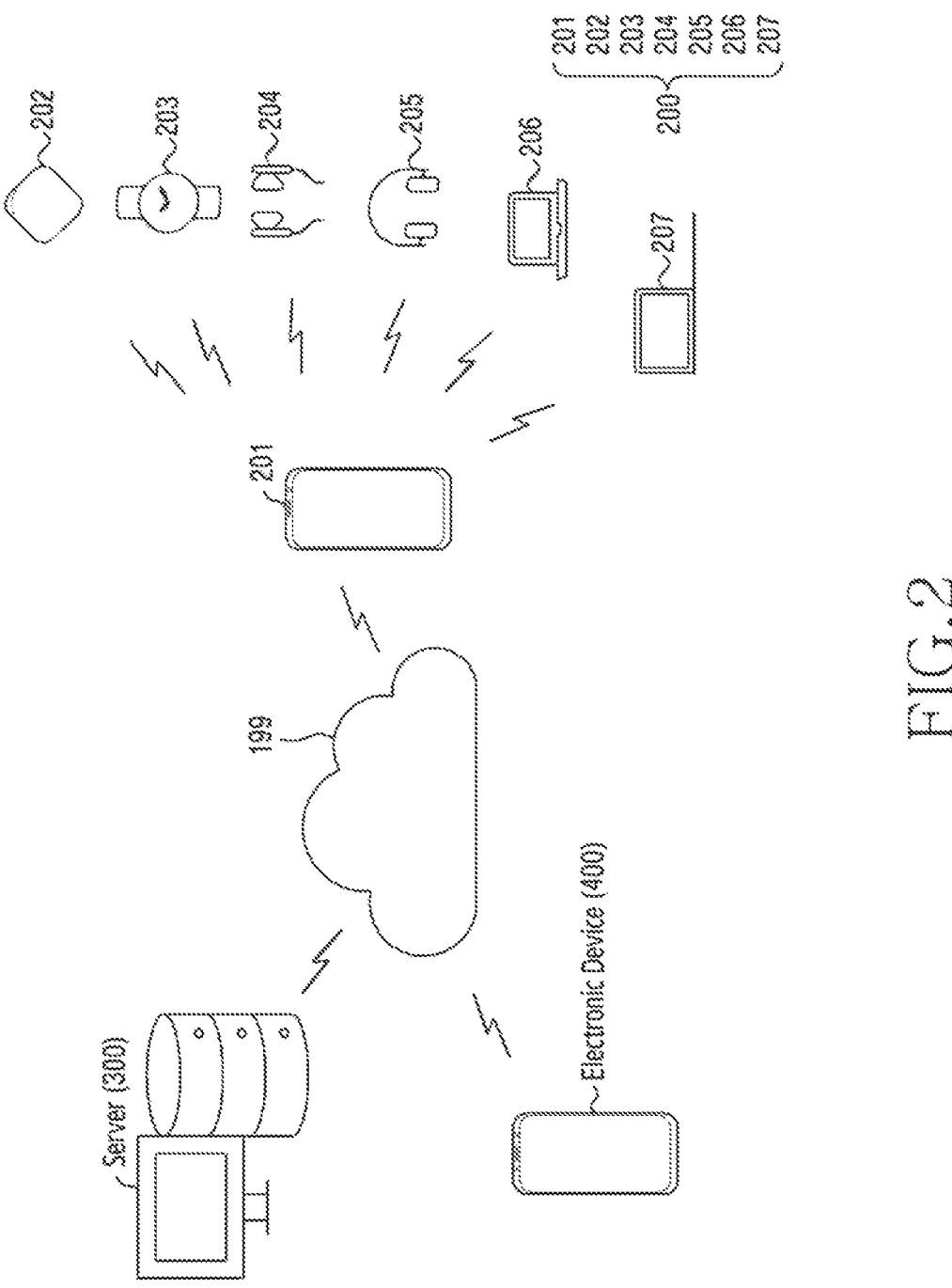
FIG. 2 illustrates a system for identifying a location of a user device according to an embodiment.

FIG. 2 illustrates a system for identifying a location of a user device according to an embodiment. In FIG. 2, a system according to an embodiment may include user devices 200, a server 300, and an electronic device 400. The electronic device 400 and at least one device among the user devices 200 may be connected to the server 300 through a second network 199 (e.g., Wi-Fi or a cellular network).

In an embodiment, the user devices 200 may include a plurality of devices. For example, a user may possess, in addition to a first device 201 that the user mainly uses, at least one of a second device 202, a third device 203, a fourth device 204, a fifth device 205, a sixth device 206, or a seventh device 207. The first device 201 may be, for example, a mobile communication device such as a smart phone. The second device 202 is a tag device of a small size that is not easily found, and may be in the form of a small object such as a key ring or a button, or manufactured in the form that may be mounted on another electronic device or an object. The third device 203 may be a wearable device such as a smart watch. The fourth device 204 may be a wireless earphone such as earbuds. The fifth device 205 may be a Bluetooth headphone or a headset. The sixth device 206 may be a notebook computer. The seventh device 207 may be a tablet.

In addition to the example shown in FIG. 2, the user may interlock and use appropriate devices other than the first device 201. For example, a key fob, a wallet, a backpack, a dog or cat identification device, an automobile, a bicycle, an identification card, a briefcase, an umbrella, or other gear may be a device capable of being associated with the first device 201 as long as they satisfy a communication function described in the present disclosure. When necessary (e.g., when they are lost), the first device 201 may perform a location tracking of a device that can be associated therewith. In addition, in some embodiments, a user may use two or more of the same device. For example, a user may use a plurality of smart phones (e.g., the first device 201) by interlocking the smart phones with each other. In addition, the user may use two or more tablets (e.g., the seventh device 207) in association with the first device 201.

In an embodiment, the user devices 200 may be connected using one or more communication protocols. For example, the first device 201 may be connected to at least one of the second device 202, the third device 203, the fourth device 204, the fifth device 205, the sixth device 206, or the seventh device 207 through a short range network. For example, a network (e.g., a short range network) for establishing a connection between the user devices 200 may be appropriately selected. For example, Bluetooth Low Energy (BLE), Wi-Fi direct, Near Field Communication (NFC), Ultra-Wide Band (UWB) communication, or infrared (Infra-red) communication with Bluetooth or instead of Bluetooth, may be used to establish a connection between the user devices 200. In addition, according to an embodiment, the user devices 200 may establish a connection using a mesh network (e.g., Zigbee or Z-Wave) through short-range wireless communication.

According to an embodiment, the user devices 200 may be connected using various methods according to device information (e.g., device elements). For example, when at least one of the user devices 200 corresponds to an IP-based (IP address) device, a connection to the second network 199 may be established using a Service Set IDentifier (SSID), and when at least one of the user devices corresponds to a non-IP-based device (e.g., BLE, Zigbee, or Z-Wave), a connection with the second network 199 may be established using a user device (e.g., the first device 201) or a hub device.

In an embodiment, the at least one of the user devices 200 may broadcast an advertising packet for providing a finding function at the time of being lost. For example, when it is determined that the second device 202 is lost, the second device 202 may broadcast various information including identification information of the second device 202 itself by using a packet. The packet may be broadcast to be received by one or a plurality of electronic devices located within a predetermined communicable range other than the second device 202. In one or more embodiments of the present disclosure, a packet or an advertising packet may correspond to a signal, message, or beacon capable of recognizing that a device has been lost.

In an embodiment, the at least one of the user devices 200 may determine whether it is lost based on various criteria. For example, when a first period of time (e.g., 15 minutes) has elapsed from a time point at which the second device 202 was last connected to the first device 201, which is a mother terminal or a main terminal, the second device may determine that an offline state in which the connection with the first device 201 is cut off has entered. For example, it may be determined that the second device 202 is in a lost state when a second period of time (e.g., 24 hours) has elapsed after entering the offline state. According to one or more embodiments, in determining the loss state, the second device 202 may additionally consider the remaining battery level in addition to a period of time. In this case, the remaining battery level may be the remaining battery level of the second device 202 itself, and the period of time may be the first period of time (e.g., 15 minutes) and the second period of time (e.g., 24 hours). Various loss determination criteria may be applied to the first period of time, the second period of time, and/or the remaining battery level according to a user configuration or a manufacturer's standard.

In one or more embodiments, the description of the electronic device 101 with reference to FIG. 1 may be appropriately applied to the user devices 200. For example, when the first device 201 is a smartphone, the first device 201 and the electronic device 101 may be the same device. In addition, for example, when the user's fourth device 204 may be earbuds without a display, other descriptions except for the display module 160 in the description of the electronic device 101 may be appropriately applied to the fourth device 204.

In an embodiment, the server 300 may correspond to the server 108 of FIG. 1. When at least one of the remaining devices (e.g., the second device 202, the third device 203, the fourth device 204, the fifth device 205, the sixth device 206, and the seventh device 207) except for the first device 201 among the user devices 200 is lost, the server 300 may provide a function of identifying the location of the at least one lost device. In one or more embodiments disclosed in the present disclosure, when the second device 202 among the user devices 200 is lost, an example in which the location of the lost second device 202 is identified by the first device 201 will be mainly described.

In an embodiment, the electronic device 400 may be a device of a user different from an owner of the second device 202. The electronic device 400 may be located in the vicinity of the second device 202 and directly or indirectly obtain an advertising packet broadcast from the second device 202. The electronic device 400 may include a short-range communication circuit for receiving a signal broadcast by the second device 202 using a short-range communication technique (e.g., BLE). In addition, the electronic device 400 may include a positioning circuit (e.g., a GPS circuit) for measuring its own location. In addition, the electronic device 400 may include a long-range communication circuit (e.g., a communication circuit supporting a cellular network and/or a Wi-Fi network) for transmitting information about the second device 202 and its own location to the server 300.

In an embodiment, the electronic device 400 may be a device (e.g., a smartphone) of the same type as the first device 201. Some or all of the description of the electronic device 101 described with reference to FIG. 1 may be applied to the electronic device 400. In addition, in one or more embodiments of this document, descriptions of the configuration or function of the first device 201 may be applied to the electronic device 400, but may not necessarily be limited thereto. The electronic device 400 may be a random electronic device supporting the above-described communication function.

Figure 3:
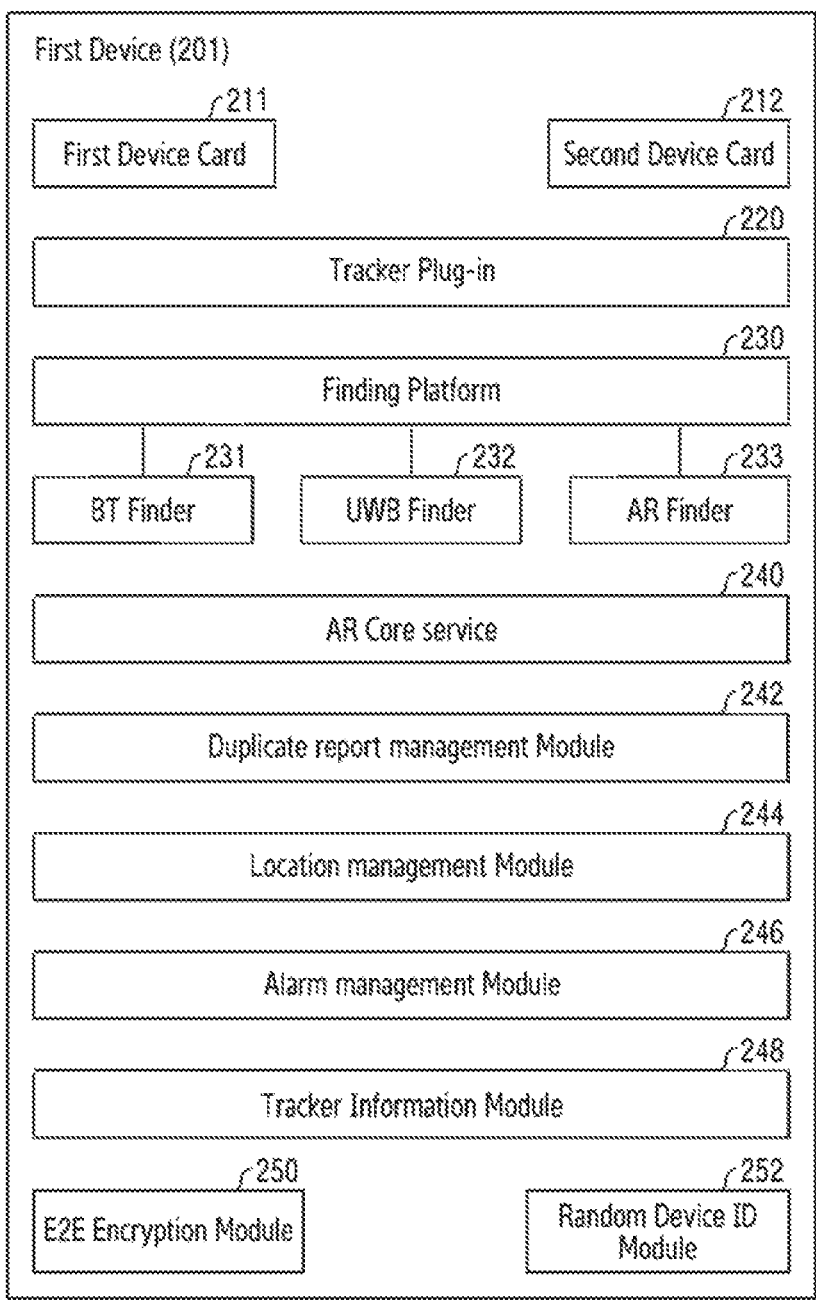
FIG. 3 illustrates modules related to various functions of an electronic device according to an embodiment.

FIG. 3 illustrates modules related to various functions of an electronic device according to an embodiment. Various functions described in FIG. 3 may be supported by a first device 201 in terms of finding a second device 202. In addition, various functions described in FIG. 3 may be supported by the electronic device 400 in terms of processing an advertising packet obtained from the second device 202. As described above, the first device 201 and the electronic device 400 may be distinguished therebetween depending on whether the device is a device of a user finding the second device 202 or a device of a user helping to find the second device 202. The functions described in FIG. 3 may be provided in both the first device 201 and the electronic device 400. Hereinafter, description will be made based on the first device 201.

A function or an operation described with reference to FIG. 3 may be performed by the processor of the first device 201. The processor may be configured to execute instructions stored in the memory to implement the software module shown in FIG. 3, and to control hardware (e.g., the communication module 190 of FIG. 1) associated with the function.

In an embodiment, the first device 201 may manage at least one device card. For example, a first device card 211 for the first device 201 may be registered in the first device 201. In addition, a second device card 212 for the second device 202 having a history of interlocking with the first device 201 may be registered in the first device 201. A device card (e.g., the first device card 211 or the second device card 212) may include device name and/or identification information, device status, device battery information, device location history, and/or information such as a device current location or a device-related message.

In an embodiment, information included in the first device card 211 and/or the second device card 212 may be configured and/or changed by a user. For example, a user of the first device 201 and/or the second device 202 may configure a name associated with the first device 201 and/or second device 202, a device type (e.g., type), or policy information.

In an embodiment, the first device 201 and the second device 202 may share the same user account. In this case, the first device card 211 and the second device card 212 may be registered in the same user account. For example, when an input for identifying the location of a device interlocked with the first device 201 by the user of the first device 201 is received, the first device 201 may provide a user interface (UI) showing information about the first device card 211 and the second device card 212 stored in the memory through a display (e.g., the display module 160 of FIG. 1). An exemplary UI will be described below with reference to FIG. 7.

In an embodiment, a user account of the first device 201 may be different from a user account of the second device 202. In this case, when the first device 201 and the second device 202 have different user accounts and it is identified that they are trusted devices, the first device card 211 and the second device card 212 may be registered with the same user account. For example, when it is identified that the first user of the first device 201 and the second user of the second device 202 are in a family relationship with each other, information of the second device 202 may be identified through a first user account of the first user of the first device 201. Hereinafter, the users of the first and second devices are the same, but one or more embodiments may be applied even when users of the first device 201 and the second device 202 are different from each other.

In an embodiment, a tracker plugin 220 may be a module for registering a user device. For example, the first device 201 may drive the tracker plugin 220. The tracker plugin 220 may provide an easy setup pop, or provide a function of registration using a QR code (QR triggering) or a manual onboarding function. For example, the user may interlock the second device 202 with the user account to register the second device 202 in the server 300 by photographing a QR code attached to one side of the second device 202 or a product case by using a camera (e.g., the camera module 180 of FIG. 1) mounted on the first device 201.

In an embodiment, a finding platform 230 may perform a function for finding an electronic device being in a lost state. The finding platform 230 may control hardware to effectively find the lost device according to a distance from the lost electronic device. For example, the finding platform 230 may operate with a Bluetooth (BT) finder 231, a UWB finder 232, and/or an AR finder 233. The BT finder 231 may control a Bluetooth communication circuit, the UWB finder 232 may control a UWB communication circuit, and the AR finder 233 may control a display.

In an embodiment, the BT finder 231 may operate when a distance between the first device 201 and the second device 202 is within a first distance (e.g., about 100 m). The finding platform 230 may control the BT finder 231, and may receive a packet from the second device 202 using a short range communication circuit supporting Bluetooth communication and/or BLE communication, or may establish a short range communication connection with the second device 202 when the distance between the first device 201 and the second device 202 is within the first distance.

In an embodiment, the UWB finder 232 may operate when the distance between the first device 201 and the second device 202 is within a second distance (e.g., about 50 m) that is less than the first distance. The finding platform 230 may control the UWB finder 232 to activate a UWB communication circuit connected to a plurality of UWB antennas to receive a signal of a UWB channel used for positioning. The finding platform 230 may receive the UWB signal received from the second device 202 using the UWB communication circuit, and may estimate the location of the second device 202 based on an arrival time and/or arrival angle of the signal received by each of the plurality of UWB antennas.

In an embodiment, the AR finder 233 may visually assist the user to find the second device 202 by implementing AR on the display when the second device 202 is in close distance. Here, for example, the term "close distance" may refer as being substantially equal to the second distance or within a third distance shorter than the second distance. The finding platform 230 may output image data acquired through the camera to the display, and may control the AR finder 233 to display the location of the second device 202 identified through the UWB finder 232 on a screen output on the display. In addition, when the first device 201 fails to effectively receive the UWB signal from the second device 202 (e.g., when the reception sensitivity is equal to or less than a threshold value), the AR finder 233 may guide the first device 201 through the display to have a posture (angle) suitable for receiving the UWB signal.

In an embodiment, when the AR finder 233 is activated for an operation, an AR core service 240 may be activated together. The AR core service 240 may control the first device 201 to access a person/object recognition database stored in the memory and/or an AR service providing server to enhance an AR environment.

In an embodiment, the BT finder 231, the UWB finder 232, and/or the AR finder 233 included in the finding platform 230 may operate simultaneously or selectively based on a distance from the second device 202. For example, when the distance between the first device 201 and the second device 202 is the second distance (e.g., within about 50 m), the BT finder 231 and the UWB finder 232 may operate simultaneously or the UWB finder 232 may be selectively operated.

In an embodiment, when the first device 201 receives the advertising packet from a random lost device (e.g., the second device 202), a duplicate report management module 242 may manage an operational procedure of re-broadcasting or reporting the received advertising packet to the server. The duplicate report management module 242 may provide a function for preventing duplicate reporting of information on a random lost device (e.g., the second device 202). For example, the duplicate report management module 242 may perform the operation of reporting/re-broadcasting the received advertising packet to the server when the advertising packet received from the second device 202 satisfies a predetermined condition, and may not perform the reporting/re-broadcasting thereof when the advertising packet does not satisfy a predetermined condition. For example, the duplicate report management module 242 may operate when the first device 201 serves as the electronic device 400 (e.g., serves as a user's device providing help to find the random lost device (e.g., the second device 202)).

In an embodiment, a location management module 244 may manage the current location and/or location change history of the second device 202 obtained from the server 300. In addition, the location management module 244 may control a location measuring circuit such as a GPS included in the first device 201 to identify and/or manage the location of the first device 201.

In an embodiment, the alarm management module 246 may manage alarm related information of the second device 202. The alarm related information may include an alarm control state obtained from the second device 202 and/or an alarm related command for the second device 202 obtained from the server 300. For example, when obtaining an alarm-related characteristic value from the second device 202, the alarm management module 246 may identify and manage the alarm control state of the second device 202 based on the acquired alarm-related characteristic value. For another example, when obtaining an alarm command for the second device 202 from the server 300, the alarm management module 246 may identify and manage the alarm control state of the second device 202 based on data included in the alarm command.

In an embodiment, a tracker information module 248 may manage the type of the second device 202 and/or identification information of the second device 202. The tracker information module 248 may operate when the first device 201 serves as the electronic device 400. For example, the tracker information module 248 may store and/or manage the device type (e.g., a smart watch, earphones, a headphone, or a tablet), the communication type (e.g., whether to support BLE, whether to support Bluetooth, whether to support a cellular network, or whether to support UWB communication), and/or identification information (e.g., a device unique Identification (ID), a network identification ID, or a user-defined ID) of the second device 202.

In an embodiment, an End-to-End (E2E) encryption module 250 may perform end-to-end encryption. The E2E encryption module 250 may operate when the first device 201 serves as the electronic device 400. For example, in response to the fact that the electronic device 400 receives the advertising packet from the random lost device (e.g., the second device 202), in the case of transmitting a message including identification information of the lost device and the location information of the electronic device 400 to the server 300, the E2E encryption module 250 may apply an encryption algorithm to the message. When the E2E encryption module 250 may encrypt the message using an encryption key associated with the lost device, a device having a decryption key corresponding to the encryption key of the lost device may obtain the location information of the lost device.

For example, the electronic device 400 may encrypt the message including the identification information of the second device 202 and the location information of the electronic device 400, using a public key of the second device 202 and transmit the encrypted message to the server 300. The first device 201 may obtain encrypted information about the lost second device 202 from the server 300 and then may decrypt the obtained information with a private key of the second device 202 to identify the location of the second device 202 (=the location of the electronic device 400). For example, the first device 201 may obtain the private key of the second device 202 in the process of registering the second device 202 in a user account, registering the same in the server 300, or performing pairing with the second device 202.

In an embodiment, a random device ID module 252 may change an identification ID of the corresponding device to a random ID by using a predetermined algorithm. The random device ID module 252 may operate when the first device 201 serves as the electronic device 400. For example, in the case of receiving the advertising packet from the second device 202, the electronic device 400 may change the identification ID of the second device 202 to a random ID for a message transmitted to the server 300. The first device 201 may identify the ID of the second device 202 from the random ID by using the predetermined algorithm.

Figure 4:
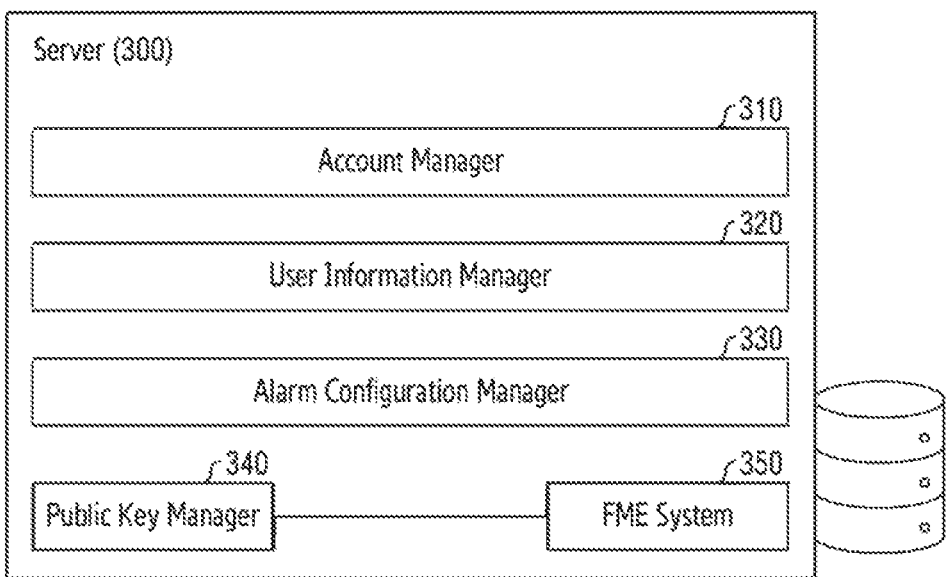
FIG. 4 illustrates modules related to various functions of a server according to an embodiment.

FIG. 4 illustrates modules related to various functions of a server according to an embodiment. In FIG. 4, the server 300 may include an account manager 310, a user information manager 320, an alarm configuration manager 330, a public key manager 340, and a Find-My-Everything (FME) system 350. The elements of the server 300 shown are classified from a functional point of view to implement one or more embodiments. The server 300 may be implemented through a plurality of hardware (e.g., a plurality of processors and storage devices for a server). In addition or alternatively, the server 300 may be replaced with a plurality of servers. For example, the server 300 may include a first server for providing an electronic device finding service in a first country and a second server for providing an electronic device finding service in a second country.

In an embodiment, the server 300 may include the account manager 310. The account manager 310 may manage a user account registered in the server 300 and/or at least one device connected to the user account. For example, when the first device 201, the second device 202, and the third device 203 are registered with the first user account, since the first device 201 and the second device 202 are linked to the same first user account, the account manager 310 may allow the first device 201 to access information about the second device 202 even if a request related to the second device 202 is received from the first device 201.

In an embodiment, the server 300 may include the user information manager 320. The user information manager 320 may manage registration, addition, deletion, and/or modification of user information associated with the user account.

In an embodiment, the server 300 may include an alarm configuration manager 330. The alarm configuration manager 330 may determine whether it is necessary to generate an alarm of the lost device (e.g., the second device 202). The server 300 may determine that the second device 202 is in a lost state based on the first signal received from the electronic device 400.

The first signal may include identification information and location information of the second device 202. The alarm configuration manager 330 may determine to generate an alarm only when the second device 202 in the lost state satisfies a designated condition. For example, when location information from the same electronic device 400 is continuously received in a situation in which a designated time has elapsed after an alarm occurs in the second device 202, or when location information is received from the same electronic device 400 in a situation in which a change in location of the second device 202 is detected, the alarm configuration manager 330 may determine that an alarm needs to be generated in the second device 202.

According to one or more embodiments, even when location information related to the second device 202 is periodically received from the plurality of electronic devices 400, the alarm configuration manager 330 may determine that an alarm needs to be generated in the second device 202, and may generate an alarm command to be configured for the second device 202 and transmit the alarm command to the at least one electronic device 400. In addition, the alarm configuration manager 330 may manage alarm-related data including the time, number, and/or location of an alarm occurring in the second device 202.

In an embodiment, the public key manager 340 may manage public keys of devices registered in the server 300. The public key may be managed in units of user accounts or may be managed in units of devices. For example, one public key may be configured per one user account. As another example, when five devices are connected with the same user account, five different public keys may be assigned to the five devices, respectively.

In an embodiment, the FME system 350 may perform a process for providing a service to find the lost device. For example, when receiving a request for the public key for the lost second device 202 from the electronic device 400, the FME system 350 may obtain the public key for the second device 202 from the public key manager 340, and may provide the obtained public key to the electronic device 400. For example, the FME system 350 may identify the user account with which the second device 202 is registered through the account manager 310. In addition, the FME system 350 may identify location information corresponding to the user account and/or the second device 202 through the user information manager 320, and may provide the location information to the first device 201 or the electronic device 400.

Figure 5:
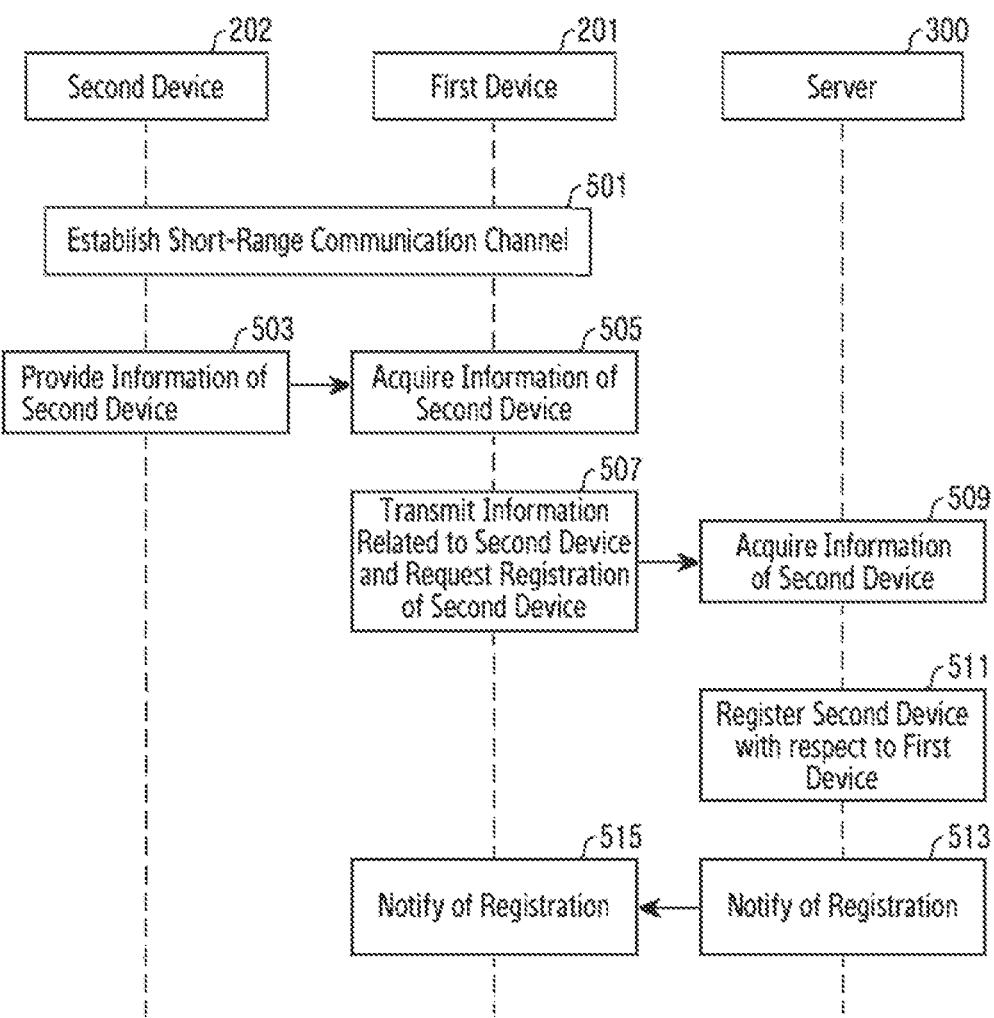
FIG. 5 illustrates an operational procedure of registering a second device by a first device in a server according to an embodiment.

FIG. 5 is a flow diagram illustrating registering a second device by a first device in a server according to an embodiment. In FIG. 5, in operation 501, the first device 201 and the second device 202 may establish a short-range communication channel. For example, the short-range communication channel may be a device-to-device connection such as Bluetooth or Wi-Fi direct, but is not limited thereto.

According to an embodiment, in operation 503, the second device 202 may provide information of the second device 202 to the first device 201 through the short-range communication channel. The information of the second device 202 may include, for example, the type of the second device 202 (e.g., tag, smart watch, or tablet), unique identification information (e.g., device ID), the manufacturer of the second device 202, hardware information of the second device 202 (e.g., processor performance, memory capacity, and/or battery capacity), software information of the second device 202 (e.g., operating system type and version, installed applications, and/or whether to support device finding service), and/or information on communication performance (e.g., whether to support Bluetooth, whether to support BLE, whether to support UWB, whether to support cellular, whether to support Wi-Fi, whether to support near field communication (NFC), and/or whether to support magnetic secure transmission (MST)).

According to an embodiment, in operation 505, the first device 201 may obtain the information of the second device 202. The first device 201 may store the obtained information of the second device 202 in the memory (e.g., the memory 130 of FIG. 1) of the first device 201.

According to an embodiment, in operation 507, the first device 201 may transmit the information of the second device 202 to the server 300 and may request registration of the second device 202. For example, the first device 201 may transmit a message of a designated format to the server 300. The message of the designated format may include information of the first device 201, user information of the first device 201, a registration request of the second device 202, and/or the information of the second device 202.

For example, when the first device 201 is registered with a first user account registered in the server 300, the first device 201 may transmit the message to the server 300 to request registration of the second device 202 with the first user account. As another example, when the first device 201 is registered with the first user account registered in the server 300 and the second device 202 is registered with a second user account registered in the server 300, the first device 201 may transmit the message to the server 300, thereby requesting registration with a third user account (e.g., group account) including the first user account and the second user account, and requesting deletion of the information of the second device 202 registered with the second user account and registration of the second device 202 with the first user account.

According to an embodiment, in operation 509, the server 300 may obtain the information of the second device 202 from the first device 201. The server 300 and the first device 201 may be connected to each other through a predetermined network (e.g., a cellular network or a Wi-Fi network).

The server 300 may obtain the information of the second device 202 transmitted from the first device 201 through the predetermined network.

According to an embodiment, in operation 511, the server 300 may register the second device 202 with respect to the first device 201. For example, the account manager 310 of the server 300 may also use the information obtained from the first device 201 to register the second device 202 with respect to a first user account corresponding to the first device 201.

According to an embodiment, in operation 513, the server 300 may transmit a notification indicating that the second device 202 has been registered to the first device 201. In operation 515, the first device 201 may receive a registration notification from the server 300.

In an embodiment, operations 501 to 515 may be referred to as a registration procedure or an onboarding procedure of the second device 202. In addition, according to an embodiment, the registration procedure or the onboarding procedure may include a procedure of storing identification information (ID) of the second device 202 (e.g., tracker) in the server 300.

When a designated time elapses after the connection between the second device 202 and the first device 201 is disconnected, the second device 202 may recognize that the second device is in a lost state and broadcast an advertising packet including its own identification information, which will be described later.

Figure 6:
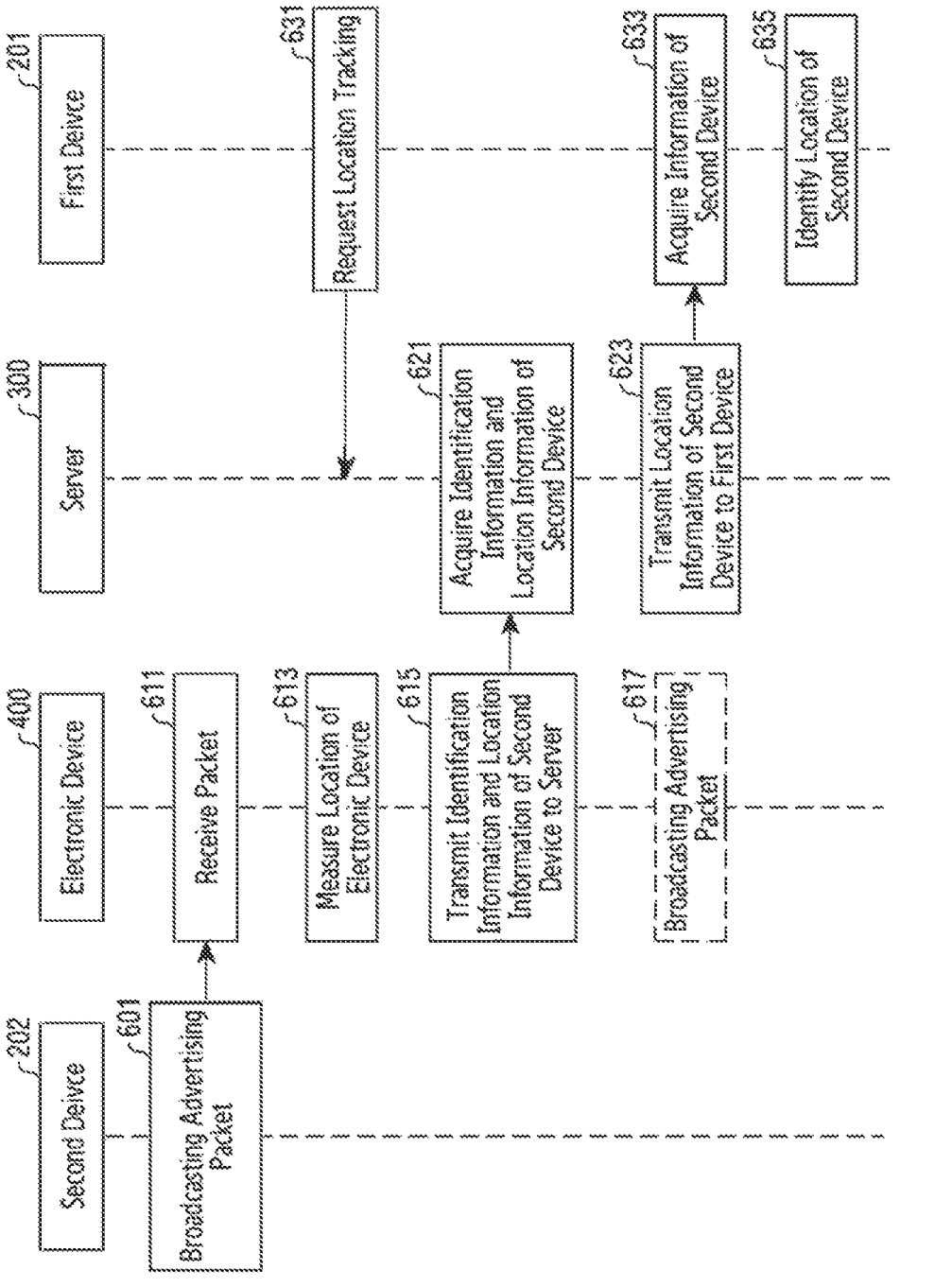
FIG. 6 illustrates an operational procedure of tracking the current location of a lost device in a finding system according to an embodiment.

FIG. 6 is a flow diagram illustrating tracking the current location of a second device in a finding system according to an embodiment. FIG. 6 illustrates a situation in which the first device 201 and the second device 202 are user devices sharing the same user account in the system of FIG. 2, and among them, the second device 202 is lost. The electronic device 400 is a random device independent of the user of the first device 201, and may be a device located within a distance capable of receiving a packet broadcast from the second device 202.

According to an embodiment, in operation 601, the second device 202 may broadcast the advertising packet using a designated communication protocol. The designated communication protocol may correspond to a type of low-power short-range communication protocol in order to minimize battery consumption. For example, the designated communication protocol may be BLE.

In an embodiment, the second device 202 may broadcast the advertising packet upon detecting that the second device 202 is in a lost state. As described above, various conditions for determining that the second device 202 is in the lost state may be configured.

However, in another embodiment, the second device 202 may broadcast the advertising packet regardless of detecting that the second device 202 is in the lost state. For example, the second device 202 may repeatedly broadcast the advertising packet for a predetermined period of time (e.g., 15 minutes) every predetermined period (e.g., 1 hour). As another example, the second device 202 may repeatedly broadcast the advertising packet for a predetermined period of time every designated time (e.g., a user configuration time).

According to an embodiment, in operation 611, the electronic device 400 may receive the advertising packet broadcast by an external device. It is assumed below that the advertising packet broadcast by the second device 202 is received.

In an embodiment, the electronic device 400 may include one ore more communication circuits. For example, the electronic device 400 may include a first wireless communication circuit supporting short-range communication for receiving an advertising packet. In addition, the electronic device 400 may include a second wireless communication circuit supporting long-range communication (e.g., cellular communication) for communicating with the server 300. In addition, the electronic device 400 may include a location measuring circuit (e.g., Global Positioning System (GPS)) for measuring its own location. The location measuring circuit may include a positioning system using a base station or an Access Point (AP) of Wi-Fi or a positioning system using an NFC beacon, in addition to a positioning system using satellite navigation such as GPS.

In an embodiment, since the advertising packet broadcast by the second device 202 uses a designated short-range communication protocol, the reception of the advertising packet may refer, for example, to the second device 202 and the electronic device 400 being within a communication distance allowed by the short-range communication protocol. For example, when the electronic device 400 receives the advertising packet through BLE, the electronic device 400 may be estimated to be located within about 100 m from the second device 202. Accordingly, from a macroscopic point of view, the location of the electronic device 400 may be treated the same as the location of the second device 202.

According to an embodiment, in operation 613, the electronic device 400 may measure the location of the electronic device 400 using the location measuring circuit. The electronic device 400 may identify the location (e.g., latitude and/or longitude coordinates) of the electronic device 400 based on a result of the measurement. For example, the electronic device 400 may receive GPS signals from the outside (e.g., three or more satellites) by controlling a location measuring circuit. The electronic device 400 may identify distance information from the electronic device 400 to satellites that have transmitted GPS signals, based on time information included in each of the GPS signals received from the outside. The electronic device 400 may identify real-time location information of the electronic device 400 from distance information corresponding to each of satellites that have transmitted GPS signals, based on a triangulation technique, for example.

According to an embodiment, in operation 615, the electronic device 400 may transmit the measured location information and the identification information of the second device 202 to the server 300. For example, the electronic device 400 may transmit a message including the identification information (e.g., unique ID and/or serial number) and location information of the second device 202 to the server 300 using the above-described second wireless communication circuit. The electronic device 400 may specify that the location information included in the message is the location information of the electronic device 400, but may allow the message to simply include the location information itself without specifying the subject of the location information.

According to an embodiment, in operation 617, the electronic device 400 may broadcast the advertising packet after transmitting the message to the server 300. For example, when the advertising packet obtained by the electronic device 400 from the second device 202 is referred to as a first packet and the advertising packet broadcasted again by the electronic device 400 is referred to as a second packet, the second packet may include substantially the same or less content (data) than the first packet. For example, in the format of the second packet, at least some of the plurality of fields included in the format of the first packet may be omitted.

In one or more embodiments, the electronic device 400 may broadcast the advertising packet before transmitting the message to the server 300 or substantially simultaneously with the transmission. In addition, operation 617 may not be performed.

According to an embodiment, in operation 621, the server 300 may acquire a message including the identification information and location information of the second device 202 from the electronic device 400. When there is a request (e.g., operation 631) for tracking the location of the second device 202 from the first device 201 before and/or after the acquisition of the message, the server 300 may transmit the location information of an external device (e.g., the second device 202) to the first device 201 in operation 623.

For example, in operation 631, the first device 201 may transmit the request for tracking the location (or identifying the location) of the second device 202 to the server 300, and the server 300 may transmit the identified information about the location of the second device 202 to the first device 201 in response to the request received from the first device 201. For example, the server 300 may transmit the most recently identified information about the location of the second device 202 to the first device 201.

According to an embodiment, in operation 633, the first device 201 may acquire the location information of the second device 202 from the server 300. In operation 635, the first device 201 may identify the location of the second device 202 based on the information acquired from the server 300. Operations 631, 633, and/or 635 may be implemented through an application providing a location identification service installed in the first device 201. In this regard, a description will be made with reference to FIG. 7.

According to an embodiment, in operation 621, when the identification information and location information of the second device 202 are acquired from the electronic device 400, the server 300 may determine whether a location tracking request (e.g., operation 631) is received from the first device 201 that has registered the second device 202 in the server 300 with the first account or from another device having a first user account.

For example, when the location tracking request (e.g., operation 631) is not received from the first device 201, the server 300 may be configured not to perform operation 623. According to an embodiment, the server 300 may transmit a response message to the electronic device 400 based on whether the location tracking request (e.g., operation 631) is received from the first device 201.

For example, when the location tracking request (e.g., operation 631) is received from the first device 201, the server 300 may transmit, to the electronic device 400, a response message indicating that the identification information and location information of the second device 202 have been transmitted to the first device 201.

As another example, when the location tracking request (e.g., operation 631) is not received from the first device 201, the server 300 may request the electronic device 400 not to transmit the identification information and location information of the second device 202 for a designated period of time. According to an embodiment, the electronic device 400 may broadcast the advertising packet (e.g., operation 617) based on a response from the server 300.

Figure 7:
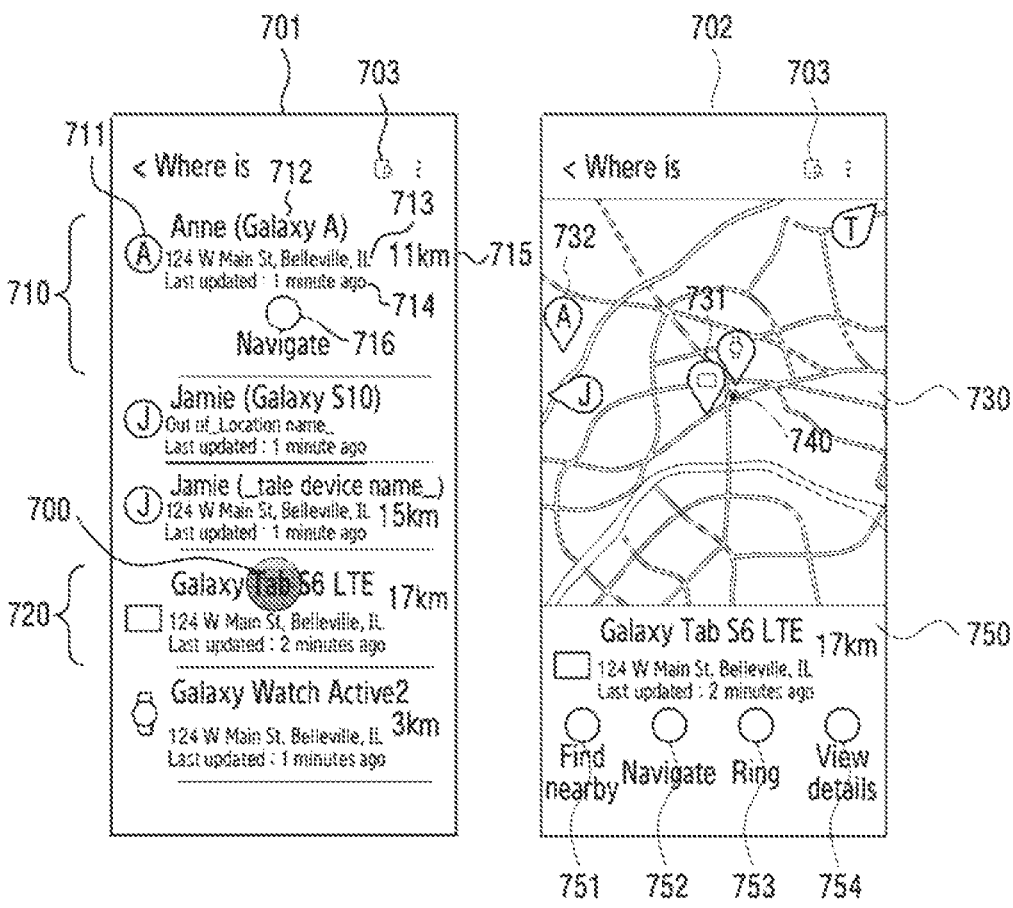
FIG. 7 illustrates a user interface for identifying locations of user devices in a first device according to an embodiment.

FIG. 7 illustrates a user interface for identifying locations of user devices in a first device according to an embodiment. In FIG. 7, a first screen 701 may be an execution screen of an application that provides a location identification service of the first device 201. The first device 201 may display information about user devices registered in the first device 201 in the form of a list.

According to an embodiment, the first screen 701 may provide or present a list including an item corresponding to a first device card 211 and an item corresponding to a second device card 212. For example, the list of the first screen 701 may include a first item 710 corresponding to a smartphone (e.g., Galaxy A) indicating the first device 201 registered with the user account of the first device 201, and a second item 720 corresponding to a random tablet (e.g., Galaxy Tab S6 LTE) registered with the user account. In the following description, the descriptions of the first item 710 and/or the second item 720 may also be applied to other items (e.g., Jamie (Galaxy S10)", "Jamie (_tale device name_), and/or "Galaxy Watch Active2"), which are not specified on the first screen 701.

In an embodiment, each item included in the list may include various types of information. For example, the first item 710 may include at least one of an icon 711 indicating the smartphone, a nickname (e.g., Anne) and model name (Galaxy A) 712 of the smartphone, the last identified location 713 (e.g., 124 W Main St, Belleville, IL), a time 714 when the corresponding location has been last identified (e.g., Last updated: 1 minute ago), a distance 715 from the current location of the first device 201 to the smartphone, and a navigation menu 716 for executing a map application or a map function based on the current location of the first device 201 and the last identified location 713. Some items of the above-described contents may be omitted. For example, when the location of the device is not identified, at least some of the last identified location 713, the time 714 when the corresponding device has been last identified, or the navigation menu 716 may not be displayed.

In an embodiment, the first device 201 may automatically perform operation 631 when the application is executed. In an embodiment, the first device 201 may perform operation 631 by a user input after the application is executed. In another embodiment, the first device 201 may perform operation 631 every predetermined period (e.g., 12 hours) and update the locations of the user devices 200 registered in the first device 201.

In an embodiment, when a user input 700 for selecting the second item 720 from among several items included in the list occurs, the first device 201 may provide a second screen 702 to the display of the first device 201. The second screen 702 may be, for example, a UI generated based on the second device card 212.

In an embodiment, the second screen 702 may include a map area 730 and a second device card area 750. For example, the map area 730 may be displayed on an upper portion (area) of the second screen 702, and the second device card area 750 may be displayed on a lower portion (area) of the second screen 702. However, this is only an example, and the second device card area 750 may be disposed at a location different from the illustrated example. For example, the second device card area 750 may be provided in a floating form on a map occupying most of the second screen 702. In addition, the location or size of the second device card area 750 may be moved/enlarged/reduced by a user input.

In an embodiment, the locations of user devices identified through the server 300 may be displayed on the map area 730. The locations of the user devices 200 may be displayed in the form of icons. For example, the location of a smartphone corresponding to the first item 710 may be displayed on the map together with the first icon 732.

In addition, the location of a tablet corresponding to the second item 720 selected by the user input 700 may be displayed on the map together with the second icon 731. In an embodiment, the location of the tablet corresponding to the second item 720 selected by the user input 700 may be located in the center of the map area 730.

In addition, a current location 740 of the first device 201 may be displayed on the map area 730. In an embodiment, the current location 740 of the first device 201 may be located in the center of the map area 730. In an embodiment, the second device card area 750 may include a device action menu 751, a navigation menu 752, a ring menu 753, and/or a detailed view menu 754.

In an embodiment, when the device action menu 751 is selected, the first device 201 may identify whether the second device 202 (e.g., a tablet corresponding to the second item 720) is in the vicinity of the first device 201. For example, when the device action menu 751 is selected, the first device 201 may provide and/or update the map area 730 based on the location of the first device 201 and the location information of the user devices 200 received from the server 300.

In addition, for example, in response to the fact that the device action menu 751 is selected, the first device 201 may discover whether the second device 202 exists nearby using a designated communication protocol (e.g., BLE). When the first device is connected to the second device 202 using the designated communication protocol, the first device 201 may drive the AR finder 233 and provide the location of the second device 202 through an augmented reality interface, or may determine whether to provide the AR interface.

In an embodiment, when the navigation menu 752 is selected, the first device 201 may display a route to the identified location of the second device 202 on the map area 730. In an embodiment, when the ring menu 753 is selected, the first device 201 may also attempt to make a call to the second device 202 or to cause the second device 202 make a designated sound.

For example, when the second device 202 supports a call function, the first device 201 may attempt to make a call to the second device 202 in response to the selection of the ring menu 753. As another example, when the second device 202 is connected to the first device 201 through a predetermined short-range communication network, in response to the selection of the ring menu 753, the first device 201 may transmit a designated signal to the second device 202 through the short-range communication network. Upon receiving the designated signal, the second device 202 may generate a predefined notification signal (e.g., alarm, vibration, and/or light emission) in response to the designated signal to notify of its location.

In an embodiment, when the detailed view menu 754 is selected, the first device 201 may provide more detailed information about the second device 202. For example, the first device 201 may display the status of the second device 202 according to various conditions. For example, when the second device 202 is connected to the first device 201 or another device (e.g., the fifth device 205 or the sixth device 206) among the user devices 200, the first device 201 may display a first status message such as "Nearby Finding".

The message may be displayed in a pop-up form or displayed in the second device card area 750 of the second device 202. In addition, when the second device 202 is not connected to the first device 201 or another device of the user devices 200 but is not in an "offline finding state", the first device 201 may display a second status message such as "Not in Range Finding". Here, "offline finding state" refers to a state in which the second device 202 is determined to be lost, and a state in which threshold time has elapsed since time when the second device 202 has been last connected to any one of the user devices 200.

In an embodiment, when the second device 202 is not connected to the first device 201 or another device of the user devices 200 and is not in the "offline finding" state, but there has been an attempt to find the second device 202, a third status message such as "Lost mode Finding" may be displayed. In addition, when the second device 202 is not connected to the first device 201 or another device of the user devices 200 and is in the "offline finding" state, the first device 201 may display a fourth status message such as "Update mode Finding".

In addition, when the first device 201 attempts to connect to the second device 202, a fifth status message such as "connecting" may be displayed. In an embodiment, the first to fifth status messages related to the device action menu 751 may be included in the first device card 211 and/or the second device card 212 of FIG. 3.

The above-described first to fifth status messages are merely examples, and fewer or more status messages may be appropriately configured by a manufacturer or a user according to one or more embodiments. For example, the first device 201 may provide remaining battery level information of the second device 202. In addition, the first device 201 may display the location (location information) of the second device 202 based on a time stamp. In addition, the first device 201 may display the current status of the second device 202 using an appropriate message (device card message). For example, the first device 201 may display, on the display, messages indicating whether the second device 202 is located in the vicinity of the first device 201 or in the vicinity of another device (e.g., the fourth device 204) of the user devices 200, where the last location of the second device 202 is, whether the second device 202 is being searched for, or whether the second device 202 has been found.

In an embodiment, information displayed (presented) in the second device card area 750 is not limited to the illustrated example, but may be provided together with at least one piece of information of information related to the device action menu 751 and information (e.g., remaining battery level information, location information, and/or device card message) included in the detailed view menu 754.

Figure 8:
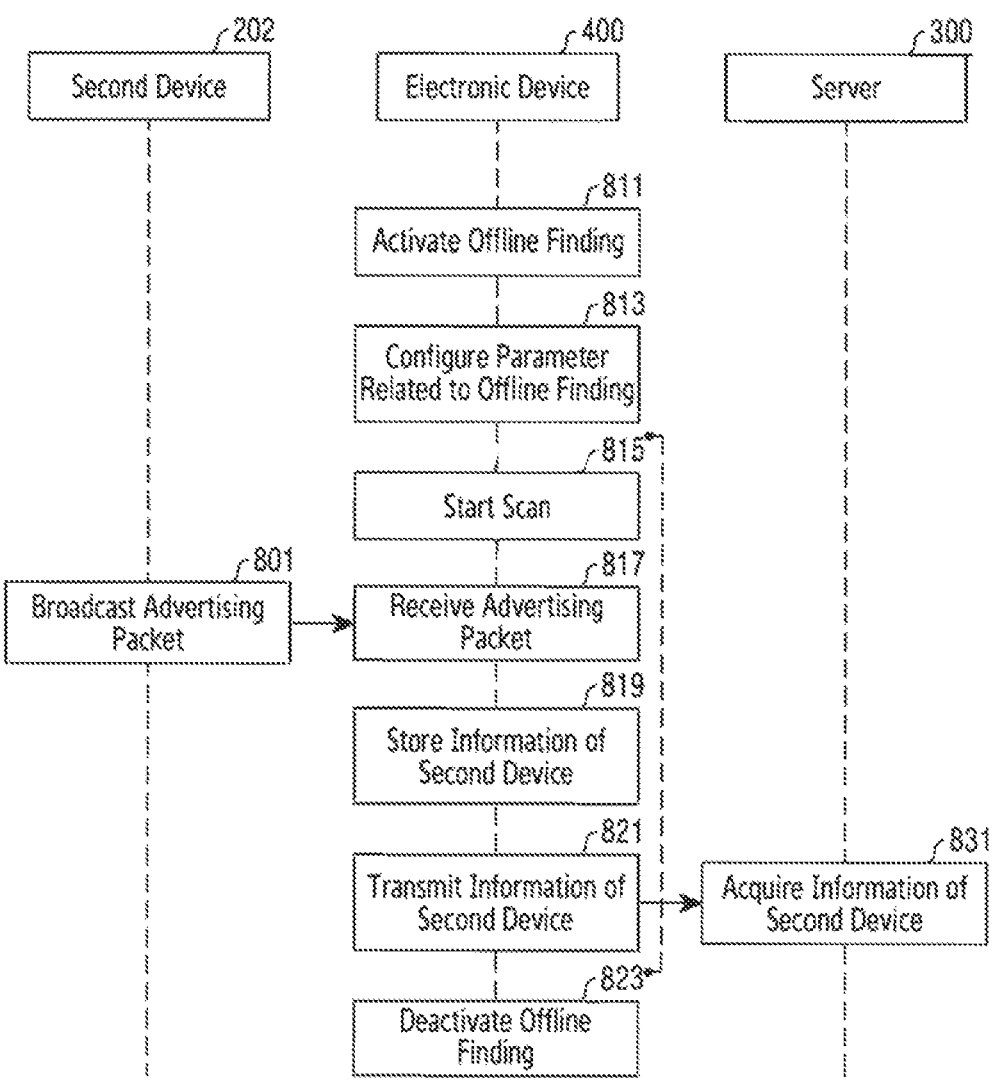
FIG. 8 illustrates an operational procedure of performing scanning by an electronic device to find a random external device according to an embodiment.

FIG. 8 is a flow diagram illustrating performing scan by an electronic device to find a random external device according to an embodiment. According to an embodiment, in operation 811, the electronic device 400 may activate offline finding. For example, the user of the electronic device 400 may activate an offline finding function in a configuration menu. For another example, the offline finding function may be periodically activated or may be always activated. As another example, the offline finding function may be activated only in a designated time duration (e.g., 9:00 am to 6:00 pm).

According to an embodiment, in operation 813, the electronic device 400 may configure parameters related to the offline finding in response to the activation of the offline finding function. For example, parameters such as scan period and scan window, scan interval, scan holding time, and/or wakeup intent may be configured. Here, the scan period may refer to a time in which scanning is performed once.

The scan window may refer to a time during which scanning is actually performed in the scan period. For example, when the scan period is 2000 ms and the scan window is 200 ms, a short range communication circuit may perform first scanning for 200 ms after wakeup, may maintain a sleep state for the remaining 1800 ms, and then, may perform second scanning again for 200 ms when 2000 ms has elapsed after wakeup.

The scan holding time may refer to a time instance for maintaining the scan in the above-described scan period. For example, the electronic device 400 may maintain scanning performed every 2000 ms for one hour. The scan interval may refer to an interval between scan holding times. For example, when the scan holding time is one hour and the scan interval is 4 hours, the electronic device 400 may maintain the scanning for one hour from 00:00, may maintain the sleep state for 3 hours, and may then maintain the scanning for one hour again from 04:00 after 4 hours have elapsed from 00:00.

According to an embodiment, operation 813 may be omitted. When operation 813 is omitted, a designated configuration value (e.g., a default value) may be used for configuring parameters related to offline finding.

According to an embodiment, in operation 815, the electronic device 400 may start scanning. The scanning of the electronic device 400 may be performed according to a rule defined by the scan-related parameters configured in operation 813. The electronic device 400 may activate a first communication circuit supporting short-range communication to acquire an advertising packet obtained from an external device (e.g., the second device 202) while scanning is performed.

According to an embodiment, the second device 202 may broadcast an advertising packet using a short-range communication protocol designated in operation 801. For example, the second device 202 may broadcast an advertising packet including identification information of the second device 202 at predetermined time intervals using a BLE protocol.

In an embodiment, the second device 202 may broadcast the advertising packet according to a change in a network state. For example, the second device 202 may determine whether the current network is available. For example, when a network connection between the second device 202 and the server 300 or the first device 201 is lost, the second device 202 may determine whether the loss of the network connection occurs due to an airplane mode. In order for an application of the second device 202 to identify the current network state, the corresponding application (e.g., an application providing a location finding service) may reside in the memory of the second device 202.

In an embodiment, when the loss of the network connection does not occur due to the airplane mode, the second device 202 may configure an alarm and may broadcast the advertising packet when the configured alarm time arrives. Thereafter, when the network is restored again (e.g., the connection with the first device 201 is restored), the second device 202 may cancel the configured alarm and may stop broadcasting the advertising packet.

According to an embodiment, after the scanning starts, in operation 817, the electronic device 400 may receive the advertising packet from an external device, for example, the second device 202. In operation 817, the electronic device 400 may obtain information of the second device 202 from information included in the received advertising packet, and may store the information obtained in operation 819 in the memory of the electronic device 400.

According to an embodiment, in operation 821, the electronic device 400 may transmit the information of the second device 202 to the server 300 based on the information received from the second device 202. The electronic device 400 may include information of the second device 202 and location information of the second device 202. Here, the location information may be the location of the electronic device 400 measured by the location measuring circuit of the electronic device 400.

In addition, the electronic device 400 may obtain an encryption key for encrypting information transmitted to the server 300, from the server 300 in order to improve security, may encrypt the information of the second device 202 with the obtained encryption key, and may transmit the encrypted information to the server 300. For example, the electronic device 400 may transmit at least part of the information of the second device 202 to the server 300, may obtain an encryption key from the server 300, and may then encrypt information and/or location information of the second device 202 using the obtained encryption key to transmit the encrypted information to the server 300.

According to an embodiment, in operation 831, the server 300 may obtain the information and/or location information of the second device 202 from the electronic device 400, and may provide information about the location of the second device 202 to the first device 201 in response to a request from the first device (e.g., operation 623 of FIG. 6).

In an embodiment, the electronic device 400 may repeat the operations 815, 817, 819, and/or 821 for a predetermined period of time, for example, a scan holding time, and may deactivate an offline finding function in operation 823 when the scan holding time ends. However, in another embodiment, the offline finding function may be deactivated by various events such as a user input or the remaining battery level of the electronic device 400.

Figure 9:
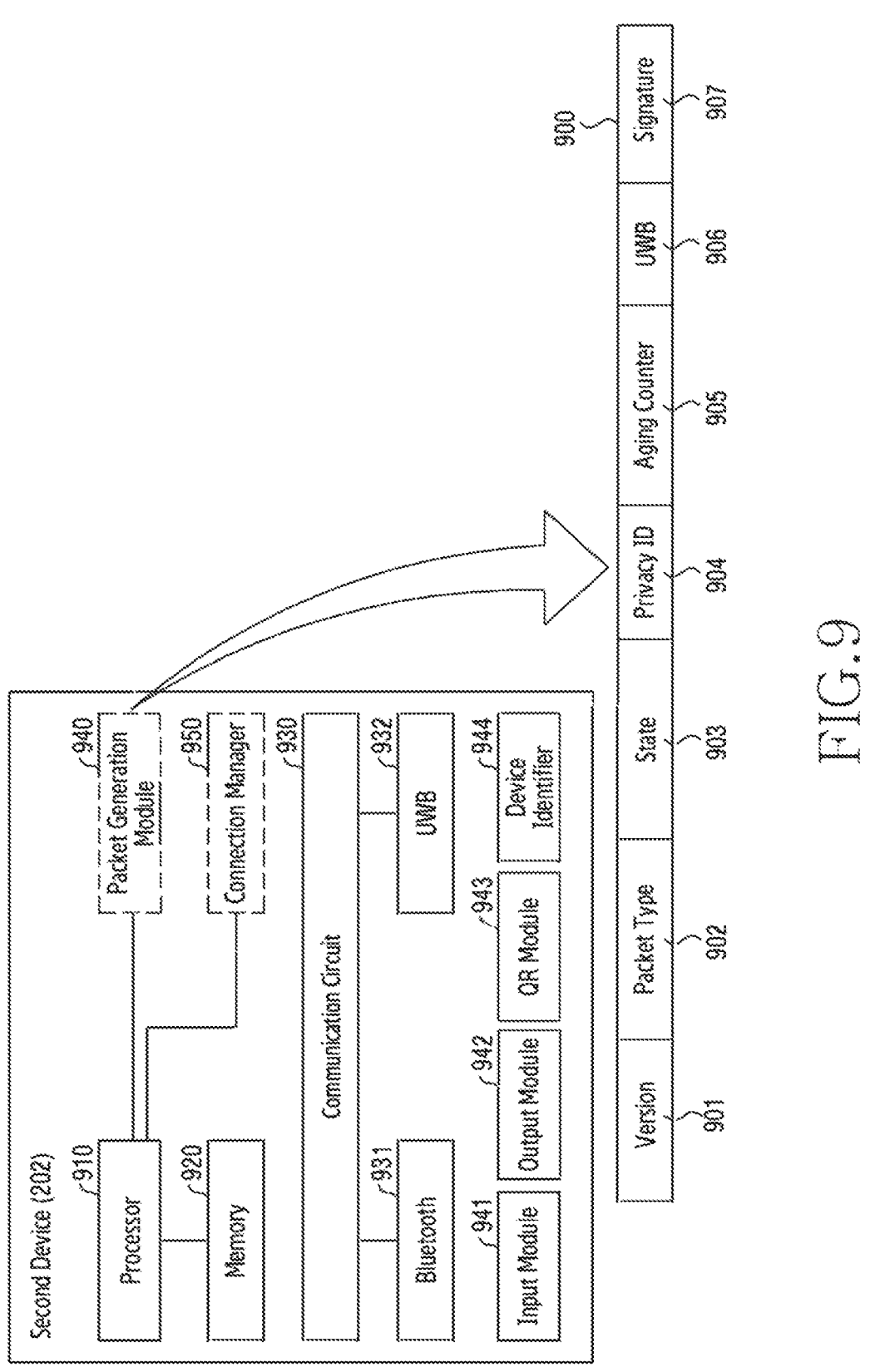
FIG. 9 illustrates a configuration of a second device and a data structure of a packet broadcast by the second device according to an embodiment.

FIG. 9 illustrates a configuration of a second device and a data structure of a packet broadcast by the second device according to an embodiment. In FIG. 9, the second device 202 may include at least one processor 910, a memory 920, and/or a communication circuit 930. The elements of the second device 202 shown in FIG. 9 are merely examples, and the elements described with reference to FIG. 1 may be appropriately applied to the second device 202. In addition, the description of FIG. 1 may be applied to the elements corresponding to FIG. 1 among the elements of FIG. 9.

In an embodiment, the at least one processor 910 may be configured to execute instructions in the memory 920 and may implement a packet generation module 940 and/or a connection manager 950. The packet generation module 940 and the connection manager 950 may be software modules implemented by executing program codes stored in the memory 920. In addition, in the following description, an operation described as being performed by the packet generation module 940 or the connection manager 950 may be performed by the processor 910.

In FIG. 9, the at least one processor 910 may drive the packet generation module 940 by executing instructions stored in the memory 920. The packet generation module 940 may generate an advertising packet 900 including information of the second device 202. The at least one processor 910 may provide the generated advertising packet 900 to the communication circuit 930 via (using) the connection manager 950, and the communication circuit 930 may use a designated protocol to broadcast the advertising packet 900.

According to one or more embodiments, the communication circuit 930 may support a short-range communication protocol of Bluetooth 931 and UWB 932. In an embodiment, the at least one processor 910 may establish a wireless connection with the first device 201 and control the communication circuit 930 to receive a first signal from the first device 201 through the wireless connection.

For example, the first signal may include a shared key registered in the server 300 in connection with the second device 202, seed information assigned to the second device 202 by the server 300, and first time information indicating the reference time of the server 300. According to one or more embodiments, the at least one processor 910 may generate an advertising packet 900 based on the first signal through the packet generation module 940, and provide the generated advertising packet 900 to the communication circuit 930.

In an embodiment, the advertising packet 900 may include a version 901, a packet type 902, a connection state 903, a privacy ID 904, an aging counter 905, a UWB 906, and/or a signature 907.

In an embodiment, the version 901 may refer to a version of the advertising packet. Since the advertising packet should be based on a rule shared between the second device 202 broadcasting the advertising packet and the electronic device 400 configured to receive and interpret the advertising packet, the version of the advertising packet may be used to determine a rule for interpreting data included in the advertising packet by the electronic device 400 that has received the advertising packet.

For example, when receiving an advertising packet of an older version instead of the latest version, the electronic device 400 may interpret the advertising packet according to a rule corresponding to the older version. As another example, when the version of the electronic device 400 is lower than the version of the advertising packet, the electronic device 400 may update the version through a server (e.g., the server 108 of FIG. 1).

In an embodiment, the packet type 902 may indicate whether the advertising packet is to transfer information or to request information. For example, when the second device 202 broadcasts the advertisement packet in order to transmit its own information, the packet type 902 may indicate a normal advertisement. When the second device 202 broadcasts the advertising packet in order to obtain information from the first device 201 or the server 300, the packet type 902 may be configured to indicate a request advertisement.

According to an embodiment, the connection state 903 may indicate information on whether the second device 202 is currently in an offline mode (e.g., offline finding) or an online mode. When the second device 202 is currently in the online mode, the connection state 903 corresponds to a state in which the second device 202 is connected to the first device 201, and may indicate information relating to a channel through which the connection is maintained.

For example, the connection state 903 may be defined by distinguishing whether a channel through which the second device 202 is connected in the online mode is a normal channel or a reserved channel, or whether both channels are being used. When the second device 202 is currently in the offline mode, the connection state 903 corresponds to an offline state in which the second device 202 is disconnected from the first device 201, and may be defined to indicate how much time has elapsed since the disconnection.

For example, the offline mode may be divided into premature offline, offline, and overmature offline according to an elapsed time after the second device 202 is disconnected. Details regarding the connection state determination criterion for the second device 202 will be described later with reference to FIG. 10.

In an embodiment, the privacy ID 904 may be unique identification information of the second device 202. Additionally and/or alternatively, the privacy ID 904 may be a random ID generated according to a predetermined algorithm based on the unique identification information of the second device 202. When the privacy ID 904 of the second device 202 is not changed, a privacy problem of being unintentionally tracked by other nearby devices recognizing the privacy ID 904 may occur, and thus the privacy ID 904 may be changed every designated time (e.g., 15 minutes).

In an embodiment, the aging counter 905 may indicate the number of times the privacy ID 904 has been changed since the second device 202 has been onboarded. For example, when the second device 202 changes the privacy ID 904 in a cycle of 15 minutes, the aging counter 905 may be increased every 15 minutes cycle based on a server time (epoch time) stored at the time of onboarding. Changing the privacy ID 904 and incrementing the aging counter 905 may be performed substantially simultaneously.

In an embodiment, the UWB 906 may indicate whether the second device 202 is a device that supports UWB communication. The advertising packet 900 may further include information on whether the second device 202 supports E2E or MCF in addition to UWB.

In an embodiment, the signature 907 corresponds to a digital signature value generated using the unique key of the second device 202 and may indicate whether the corresponding advertising packet is valid. The signature 907 may be calculated in real time every time the advertising packet is transmitted and added to the field of the advertising packet.

In one or more embodiments, the second device 202 may further include an input module 941, an output module 942, a QR code 943, and a device identifier 944. In an embodiment, the input module 941 is a measure for identifying the user's intention, and may be in the form of a physical button. For example, when an alarm occurs in the second device 202, the user may click a button provided in the second device 202 to stop the alarm. In an embodiment, the output module 942 is a measure for generating an audio signal, and may include a buzzer type device. In an embodiment, the QR code 943 may be a measure for easily performing procedures such as identification, registration, and/or onboarding of the second device 202, and may be printed on the second device 202 or printed on a separate sticker and attached to the second device 202. In an embodiment, the device identifier 944 is identification information uniquely assigned to the second device 202, and may include a product serial number or a short-range communication MAC address of the second device 202.

Figure 10:
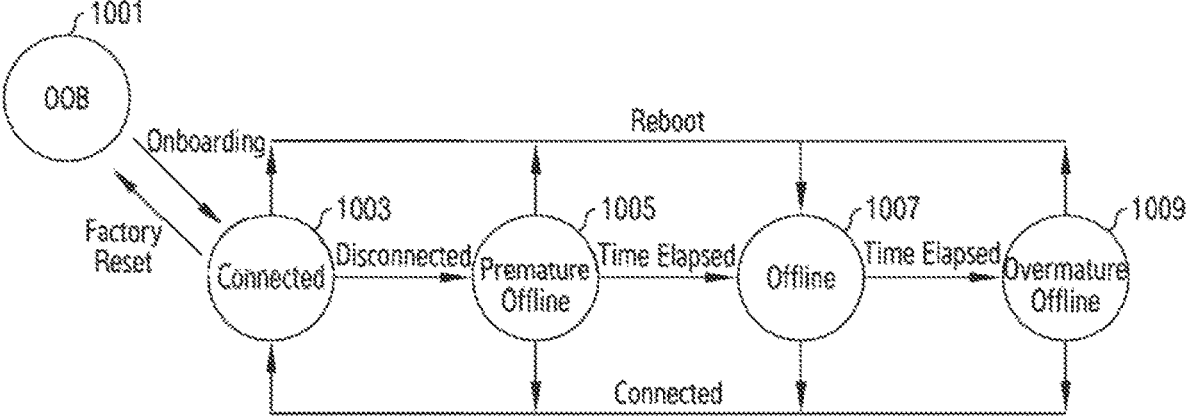
FIG. 10 illustrates a state determination criterion of a second device according to an embodiment.

FIG. 10 illustrates a state determination criterion of a second device according to an embodiment. In FIG. 10, the second device 202 may be subject to state change of Out Of Box (OOB) 1001, connected 1003, premature offline 1005, offline 1007, or overmature offline 1009 according to a system configuration, whether or not connected to the first device 201, and/or a time elapsed after the connection is disconnected.

In an embodiment, the OOB 1001 may refer to a state before system setup is completed after a product box of the second device 202 is initially opened. The second device 202 in the OOB 1001 state may be connected to the first device 201 through an onboarding procedure and registered in the server 300. In addition, the second device 202 may transition again to the OOB 1001 state through factory reset even after system setup is completed.

In an embodiment, the connected 1003 may refer to a state in which the second device 202 is connected by establishing a short-range communication channel with the first device 201. The second device 202 may identify the first device 201 and establish a connection by using a shared key registered in the server 300 during the onboarding process. For example, the second device 202 in the connected 1003 state may communicate with the first device 201 based on a Generic ATTribute profile (GATT) connection. In addition, the second device 202 may immediately transition to the connected 1003 state when a connection with the first device 210 is established in the premature offline 1005, offline 1007, and overmature offline 1009 states.

According to an embodiment, the premature offline 1005 may refer to a state until a first period of time (e.g., 15 minutes) elapses after the second device 202 is disconnected from the first device 201. The second device 202 may not transition to the offline 1007 state immediately after disconnection from the first device 210, and may maintain the premature offline 1005 state for the first period of time.

According to an embodiment, the offline 1007 may refer to a state after a first period of time has elapsed after the second device 202 is disconnected from the first device 201. After entering the premature offline 1005 state, the second device 202 may transition to the offline 1007 state when a first period of time (e.g., 15 minutes) elapses, and thereafter, the second device may maintain the offline 1007 state until a second period of time (e.g., 24 hours) further elapses. The second device 202 may transition to the offline 1007 state upon initiating a system reboot in the connected 1003, premature offline 1005 and overmature offline 1009 states. Various determination criteria may be applied to the first period of time and the second period of time according to a user configuration or a manufacturer's standard.

In an embodiment, the overmature offline 1009 may refer to a state after a second period of time (e.g., 24 hours) has elapsed after the second device 202 enters the offline 1007 state. The second device 202 in the overmature offline 1009 state may determine that the second device is lost, and may broadcast an advertising packet including identification information of the second device 202 to electronic devices located within a predetermined distance.

Figure 11:
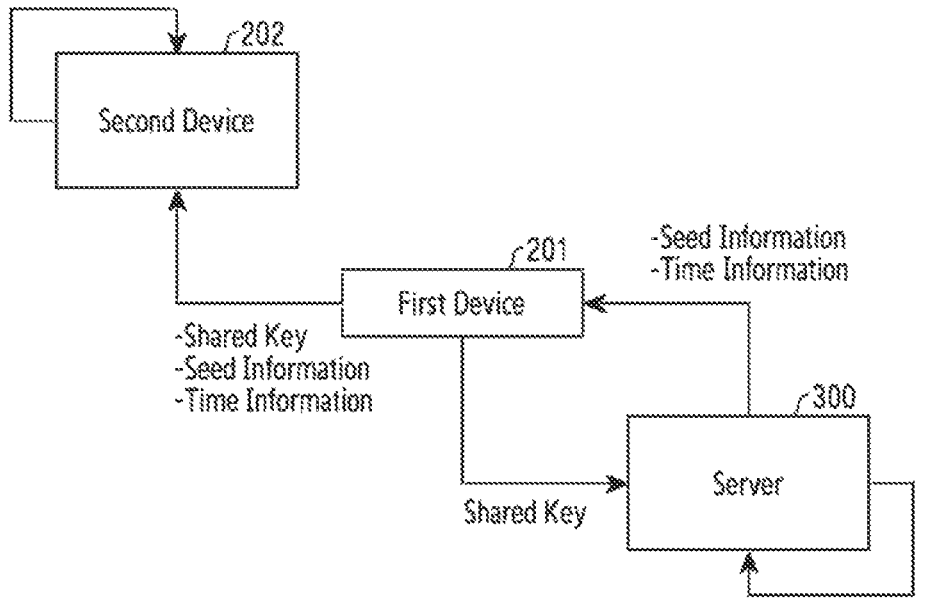
FIG. 11 illustrates a packet generation method according to an embodiment.

FIG. 11 illustrates an operation of a packet generation according to an embodiment. In FIG. 11, a first device 201 and a second device 202 are user devices sharing the same user account, and may be connected through a short-range network. A server 300 may register and manage the second device 202 with the same user account as that of the first device 201, and may provide a function of identifying the location of the second device 202 in a lost or overmature offline state. According to one or more embodiments, the embodiment disclosed in FIG. 11 may be applied to the registration process of FIG. 5.

In an embodiment, the second device 202 may be connected to the first device 201 through an onboarding procedure to set up a system and be registered in the server 300. For example, the first device 201 may generate a shared key for the second device 202 by using an onboarding app, and may transfer the generated shared key together with identification information of the second device 202 to the server 300. According to an embodiment, the onboarding app may be an application installed in the first device 201. For example, the onboarding app may provide a function of registering the second device 202 in the server 300 for the same user account as that of the first device 201.

In an embodiment, when receiving a registration request for the second device 202 from the first device 201, the server 300 may generate unique seed information for the second device 202. In addition, the server 300 may transmit the generated seed information and time information to be configured for the second device 202 to the first device 201. For example, the time information may be a reference time calculated based on an epoch time configured in the server 300.

In an embodiment, the first device 201 may obtain the seed information and the time information from the server 300 by using an onboarding app. In addition, the first device 201 may transmit the generated shared key, and the seed information and the time information obtained from the server 300 to the second device 202, using the onboarding app. The shared key, seed information, and time information stored in the server 300 may be shared with the second device 202 through the onboarding app of the first device 201. In addition, parameters required for generating the privacy ID of the second device 202 may be shared with the server 300 through the onboarding app of the first device 201. For example, parameters required for generating a privacy ID of the second device 202 may include an initial vector and a size of a privacy ID generation pool.

In an embodiment, the second device 202 may generate a private key for generating a privacy ID and a signature key for authenticating an advertising packet based on the shared key. Similarly, the server 300 may generate, store, and manage the private key and the signature key for the second device 202 based on the shared key. For example, the private key and the signature key may be generated equally in the second device 202 and the server 300 using a Key Derivation Function (KDF) defined in American National Standards Institute (ANSI) x9.63.

In an embodiment, the second device 202 may generate a privacy ID every designated period using the seed information and parameters shared with the server 300 and the generated private key, and based on the time information, may calculate an aging counter every designated period. For example, the second device 202 may increment the aging counter while generating the privacy ID according to the designated period.

In addition, the second device 202 may generate a packet including the privacy ID and the aging counter, and encrypt data of the generated packet with the signature key to generate signature information. The second device 202 may broadcast an advertising packet including the privacy ID, the aging counter, and the signature information.

In an embodiment, the server 300 may obtain at least some data and location information of the advertising packet from the electronic device that has received the advertising packet. The server 300 may verify at least some data of the advertising packet by using the pieces of information shared with the second device 202 and the private key and signature key generated in the same manner as the second device 202. The server 300 may determine whether to update the acquired location information for the second device 202 based on a result of the verification. For example, when at least some data of the advertising packet is the same as data calculated by the server 300, the server 300 may update the obtained location information with the location of the second device 202.

Figure 12:
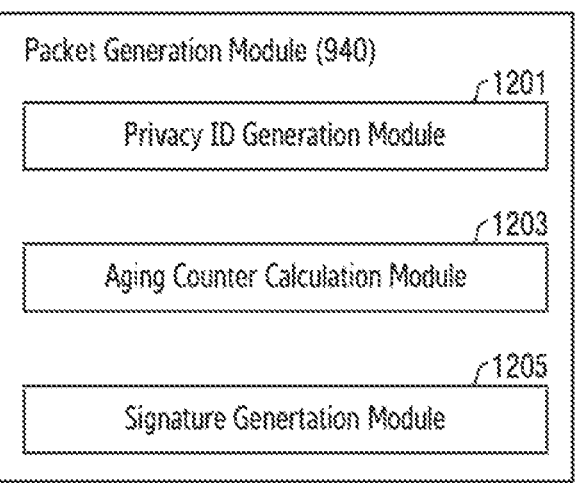
FIG. 12 illustrates a detailed configuration of modules related to a function of generating a packet according to an embodiment.

FIG. 12 illustrates a detailed configuration of modules related to a function of generating a packet according to an embodiment. FIG. 12 illustrates as a detailed configuration of the packet generation module 940 of the second device 202 shown in FIG. 9.

In an embodiment, the packet generation module 940 may include a privacy ID generation module 1201, an aging counter calculation module 1203, and a signature generation module 1205. The operations performed by the modules described with reference to FIG. 12 may be performed by the at least one processor 910 included in the second device 202 configured to broadcast the advertising packet 900 to provide a location identification service.

In an embodiment, the packet generation module 940 may generate data to be included in the advertising packet based on the first signal received from the first device 201. The first signal may include a shared key registered in the server 300 in connection with the electronic device (e.g., the second device 202), seed information provided to the electronic device by the server 300, and first time information indicating the reference time of the server 300.

In addition, the packet generation module 940 may calculate, using the shared key, a private key for generating a privacy ID and a signature key for authenticating the advertising packet, and may store the private key and the signature key in the memory (e.g., the memory 920 of FIG. 9) of the second device 202.

In an embodiment, the privacy ID generation module 1201 may generate a first string by combining a random number and the seed information, and may encrypt the first string using the private key to generate the privacy ID. For example, the privacy ID generation module 1201 may generate the first string by adding the random number as a prefix and/or a postfix to the seed information.

According to one or more embodiments, the privacy ID generation module 1201 may use a modular arithmetic using a remaining value obtained by dividing the random number by a size of a privacy ID generation pool in order to limit the range of the random number.

In an embodiment, the privacy ID generation module 1201 may encrypt the first string using a predetermined algorithm. For example, the privacy ID generation module 1201 may generate a privacy ID by encrypting the first string with the private key by using an Advanced Encryption Standard (AES). According to one or more embodiments, in the process of encrypting the first string, parameters shared with the server 300 through the first device 201 may be additionally used during onboarding of the second device 202.

In an embodiment, the privacy ID generation module 1201 may add at least a part of the encrypted first string to a privacy ID field (e.g., the privacy ID 904 in FIG. 9) of the advertising packet. For example, when the size of the privacy ID field in the advertising packet is limited to 8 bytes, the privacy ID generation module 1201 may extract 8 consecutive bytes from the encrypted first string to add the extracted 8 consecutive bytes to the privacy ID.

The privacy ID generation module 1201 may change the privacy ID every designated time period (e.g., 900 seconds), and the aging counter included in the advertising packet may also be changed at a time point at which the privacy ID is changed. The privacy ID generation module 1201 may prevent the second device 202 from being tracked by a random electronic device or user due to the stealing or eavesdropping of the advertising packet, by changing the privacy ID every designated period.

In an embodiment, the aging counter calculation module 1203 may calculate first time information indicating a reference time configured in the server 300, and second time information indicating a difference between the first time information and a current time counted by the second device 202. For example, the first time information may be a reference time calculated based on an epoch time configured in the server 300.

According to one or more embodiments, the first device 201 may compare a current time counted by the second device 202 with a current time counted by the server 300 at a predetermined time period. If the time difference calculated as a result of the comparison exceeds an allowable error range, the first device 201 may synchronize the configuration time of the second device 202 with the configuration time of the server 300. For example, the first device 201 may transmit the configuration time information of the server 300 obtained from the server 300 to the second device 202.

In an embodiment, the aging counter calculation module 1203 may calculate or generate the aging counter based on the second time information and the designated time period, and may add the aging counter to an aging counter field of the advertising packet (e.g., the aging counter 905 of FIG. 9). For example, the aging counter calculation module 1203 may calculate a quotient obtained by dividing the second time information by the designated time period as the aging counter. Accordingly, the aging counter may be incremented by 1 every time the privacy ID is changed.

The server 300 may verify whether the aging counter calculated by the aging counter calculation module 1203 is appropriate because the server shares time information and parameters required for generating the privacy ID. Accordingly, even if the advertising packet is copied and transmitted to the server 300 by a random electronic device or user who knows the changed privacy ID, the server 300 may recognize that the advertising packet is copied and ignore.

In an embodiment, the signature generation module 1205 may generate a first packet including the privacy ID and the aging counter, and may encrypt data of the first packet with the signature key to generate the signature information. The first packet may further include information such as a packet version, a packet type, or a connection state. According to one or more embodiments, the signature generation module 1205 may encrypt the first packet using a predetermined algorithm. For example, the signature generation module 1205 may encrypt the data of the first packet with the signature key using an advanced encryption standard algorithm (e.g., AES_128-CBC-PKCS7Padding algorithm) to generate signature information.

In an embodiment, the signature generation module 1205 may add at least a part of the encrypted data to a signature field of the advertising packet (e.g., the signature 907 of FIG. 9). For example, if the size of the signature field in the advertising packet is limited to 4 bytes, the signature generation module 1205 may extract 4 consecutive bytes from the encrypted data and add the extracted 4 consecutive bytes to the signature field. The signature generation module 1205 may generate the signature information every time an advertising packet is transmitted, thereby preparing for a situation in which an advertising packet, in which a privacy ID and an aging counter are falsified by an electronic device or user, is transmitted.

Figure 13:
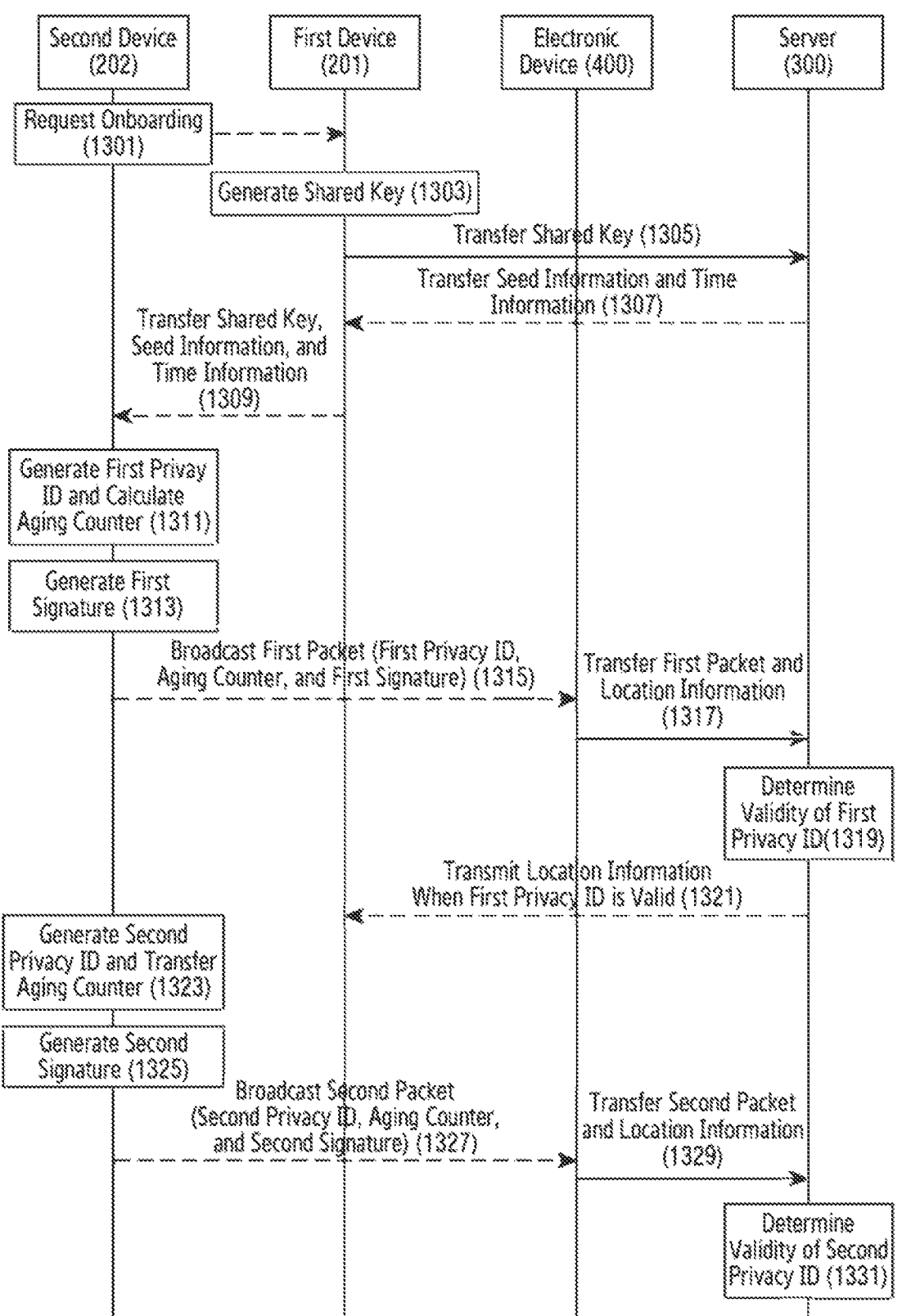
FIG. 13 illustrates an operational procedure of generating and broadcasting a packet in a second device according to an embodiment.

FIG. 13 illustrates an operational procedure of generating and broadcasting a packet in a second device according to an embodiment. In FIG. 13, in operation 1301, the second device 202 may transmit a request for initiating an onboarding procedure to the first device 201. For example, in an OOB state, the second device 202 may broadcast a signal indicating that the second device itself is in an on-boardable state. Upon receiving the signal broadcast by the second device 202, the first device 201 may display to the user that there is an onboarding request from the second device 202, and may execute an onboarding app.

The first device 201 may request registration from the server 300 to register the second device 202 with the same user account as the first device itself through the onboarding app. According to one or more embodiments, the second device 202 may establish a wireless communication connection with the first device 201 through an onboarding procedure and set up a system. The wireless communication connection may be a connection based on a BLE communication standard.

According to an embodiment, the first device 201 may generate a shared key for the second device 202 in operation 1303, and may transmit the shared key to the server 300 in operation 1305. For example, the first device 201 may transmit the shared key generated for the second device 202 and the identification information of the second device 202 to the server 300, and register the second device 202 in the server 300 in association with the first device 201.

According to an embodiment, in operation 1307, the server 300 may transmit, to the first device 201, seed information uniquely generated for the second device 202 and time information to be configured for the second device 202. For example, the time information may be a reference time calculated based on an epoch time configured in the server 300.

According to an embodiment, in operation 1309, the first device 201 may transmit, to the second device 202, the shared key previously generated for the second device 202 and the seed information and time information received from the server 300. In addition, parameters required for generating the privacy ID of the second device 202 in operations 1301 to 1309 may be shared with the server 300 by the first device 201.

According to an embodiment, in operation 1311, the second device 202 may generate a first privacy ID using the shared key, the seed information, and parameters shared with the server 300, and may count a first aging counter based on the time information. For example, the second device 202 may generate a private key for generating a privacy ID using the shared key. The second device 202 may generate a first string by combining a random number and the seed information, and may generate the first privacy ID by encrypting the first string using the private key.

According to one or more embodiments, the second device 202 may limit the range of the random number through a modular arithmetic taking a remainder value obtained by dividing the random number by the size of privacy ID generation pool. For example, if the size of the privacy ID generation pool of the second device 202 is 1000, a value of 0 to 999, which is the remainder value obtained by dividing the random number by 1000, may be combined with the seed information.

In an embodiment, when the length of the advertising packet broadcast by the second device 202 is limited, the second device 202 may add at least a part of the encrypted first string to a privacy ID field of a first advertising packet. The second device 202 may calculate an aging counter included in the first advertising packet at the time of generating the first privacy ID.

According to one or more embodiments, the second device 202 may calculate second time information indicating a difference between first time information indicating a reference time configured in the server 300 and a current time (a time at which operation 1311 is performed) counted by the second device 202 based on the first time information. For example, the first time information may be a reference time calculated based on an epoch time configured in the server 300. The second device 202 may calculate the first aging counter based on the second time information and a designated time period, and may add the calculated first aging counter to an aging counter field of the first advertising packet.

According to one or more embodiments, the first device 201 or the electronic device 400 may compare the current time counted by the second device 202 with the current time counted by the server 300 at a predetermined time period. When the time difference calculated as a result of the comparison exceeds an allowable error range, the configuration time of the second device 202 may be synchronized with the configuration time of the server 300.

According to an embodiment, in operation 1313, the second device 202 may generate first signature information by using the shared key. For example, the second device 202 may generate a signature key for authenticating the first advertising packet by using the shared key.

The second device 202 may generate a packet including the first privacy ID and the first aging counter, and may encrypt data of the packet with the signature key to generate the first signature information. According to one or more embodiments, when the length of the advertising packet broadcast by the second device 202 is limited, the second device 202 may add at least a part of the encrypted data to a signature field of the first advertising packet.

According to an embodiment, in operation 1315, the second device 202 may broadcast a first advertising packet including the first privacy ID, the first aging counter, and the first signature information. For example, when a predetermined period of time (e.g., 24 hours) elapses after the second device 202 is disconnected from the first device 201, the second device 202 enters an overmature offline state in which the second device itself recognizes as being lost, and may broadcast the first advertising packet. According to another embodiment, the second device 202 may repeatedly broadcast the packet at every designated time or for a predetermined period of time based on a user's configuration.

According to an embodiment, in operation 1317, the electronic device 400 may receive the first advertising packet, and may transmit at least some data of the first advertising packet and its own location information to the server 300. The electronic device 400 may be a random device regardless of a user of the first device 201, and may be a device located within a distance capable of receiving a packet broadcast from the second device 202. In addition, since the electronic device 400 is located within a distance close enough to enable wireless communication with the second device 202, the location information measured by the electronic device 400 may be same as the location information of the second device 202.

According to an embodiment, in operation 1319, the server 300 may determine the validity of the data of the first advertising packet, based on the shared key registered for the second device 202. For example, the server 300 may generate a private key in the same manner as the second device 202 by using the shared key, and may verify the validity of the first privacy ID of the first advertising packet by using the parameters shared with the second device 202 and the private key.

For another example, the server 300 may generate a signature key in the same manner as the second device 202 by using the shared key, and may verify the validity of at least some data of the first advertising packet by using the signature key. In operation 1321, the server 300 may update the location information obtained from the electronic device 400 with the location of the second device 202 only when the validity of at least some data of the first advertising packet is verified, and notify the first device 201 of the updated location information.

According to an embodiment, in operation 1323, the second device 202 may generate a second privacy ID and calculate a second aging counter. Operation 1323 may be performed after a designated time period (e.g., 900 seconds) has elapsed from the execution time of operation 1311. The second device 202 may change the random number and generate a second privacy ID using the changed random number in the same manner as in operation 1311. For example, the second device 202 may generate a second string by combining the changed random number with the seed information, and may encrypt the second string using the private key to generate the second privacy ID.

In a case that the length of the advertising packet broadcast by the second device 202 is limited, the second device 202 may add at least a part of the encrypted second string to a privacy ID field of a second advertising packet. The second device 202 may calculate the aging counter at the time of generating the second privacy ID.

According to one or more embodiments, the second device 202 may calculate second time information indicating a difference between first time information indicating a reference time configured in the server 300 and a current time (a time at which operation 1323 is performed) counted by the second device 202 based on the first time information. The second device 202 may calculate the second aging counter based on the second time information and a designated time period, and may add the calculated second aging counter to an aging counter field of the second advertising packet.

According to an embodiment, in operation 1325, the second device 202 may generate second signature information in the same manner as in operation 1313 using the shared key. For example, the second device 202 may generate a signature key for authenticating the second advertising packet by using the shared key. The second device 202 may generate a packet including the second privacy ID and the second aging counter, and may encrypt data of the packet with the signature key to generate the second signature information.

According to one or more embodiments, when the length of the advertising packet broadcast by the second device 202 is limited, the second device 202 may add at least a part of the encrypted data to a signature field of the second advertising packet. According to an embodiment, in operation 1327, the second device 202 may broadcast a second advertising packet including the second privacy ID, the second aging counter, and the second signature information.

According to an embodiment, in operation 1329, the electronic device 400 may receive the second advertising packet, and may transmit at least some data of the second advertising packet and its own location information to the server 300.

According to an embodiment, in operation 1331, the server 300 may determine the validity of the data of the second advertising packet based on the private key and the signature key registered for the second device 202 and, only when the validity is verified, may update the location information obtained from the electronic device 400 with the location of the second device 202 and notify the first device 201 of the updated location information.

An electronic device according to an embodiment may include: a wireless communication circuit: at least one processor operatively connected to the wireless communication circuit; and a memory configured to store data acquired from a first external device and operatively connected to the at least one processor, wherein the memory stores instructions which, when executed, cause the at least one processor to: establish a wireless connection with the first external device and control the wireless communication circuit to receive a first signal from the first external device through the wireless connection, the first signal including a shared key which is registered in a server in connection with the electronic device, seed information assigned to the electronic device by the server, and first time information indicating a reference time of the server: generate an advertising packet including at least one of a privacy ID, an aging counter, and signature information based on the first signal; and broadcast the generated advertising packet by using the wireless communication circuit.

In an embodiment, the instructions may cause the at least one processor to calculate, by using the shared key, a private key for generating the privacy ID and a signature key for authenticating the advertising packet, and store the private key and the signature key in the memory.

In an embodiment, the instructions may cause the at least one processor to generate a first string by combining a random number and the seed information, and generate the privacy ID by encrypting the first string using the private key.

In an embodiment, the instructions may cause the at least one processor to apply a modular arithmetic to the random number by using a size of a privacy ID generation pool.

In an embodiment, the instructions may cause the at least one processor to add at least a part of the encrypted first string to a privacy ID field of the advertising packet.

In an embodiment, the instructions may cause the at least one processor to generate the privacy ID and the aging counter every designated time period.

In an embodiment, the instructions may cause the at least one processor to calculate second time information indicating a difference between the first time information and a current time counted based on the first time information, and generate the aging counter based on the second time information and the designated time period to add the generated aging counter to an aging counter field of the advertising packet.

In an embodiment, the instructions may cause the at least one processor to generate a packet including the privacy ID and the aging counter, and encrypt data of the packet with the signature key to generate the signature information.

In an embodiment, the instructions may cause the at least one processor to add at least a part of the data encrypted with the signature key to a signature information field of the advertising packet.

In an embodiment, the wireless connection may correspond to a connection based on a BLE communication standard.

A method for operating an electronic device according to another embodiment may include: establishing a wireless connection with a first external device: receiving a first signal from the first external device through the wireless connection, the first signal including a shared key which is registered in a server in connection with the electronic device, seed information assigned to the electronic device by the server, and first time information indicating a reference time of the server: generating an advertising packet including at least one of a privacy ID, an aging counter, and signature information based on the first signal; and broadcasting the generated advertising packet.

In an embodiment, the method may include calculating a private key for generating the privacy ID and a signature key for authenticating the advertising packet, by using the shared key; and storing the private key and the signature key in a memory.

In an embodiment, the generating of the advertising packet may include: generating a first string by combining a random number and the seed information; and generating the privacy ID by encrypting the first string using the private key.

In an embodiment, the generating of the first string may include calculating a value, obtained by applying a modular arithmetic to the random number using a size of a privacy ID generation pool, and combining the seed information with the calculated value.

In an embodiment, the generating of the advertising packet may include adding at least a part of the encrypted first string to a privacy ID field of the advertising packet.

In an embodiment, the privacy ID and the aging counter may be generated at every designated time period.

In an embodiment, the generating of the advertising packet may include: calculating second time information indicating a difference between the first time information and a current time counted based on the first time information, and generating the aging counter based on the second time information and the designated time period, to add the generated aging counter to an aging counter field of the advertising packet.

In an embodiment, the generating of the advertising packet may include: generating a packet including the privacy ID and the aging counter; and encrypting data of the packet with the signature key to generate the signature information.

In an embodiment, the generating of the advertising packet may include adding at least a part of the data encrypted with the signature key to a signature information field of the advertising packet.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with,"

"coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a wireless communication circuit;
at least one processor; and
memory storing instructions which, when executed by the at least one processor, cause the electronic device to:
establish a wireless connection with a first external device and control the wireless communication circuit to receive a first signal from the first external device through the wireless connection, the first signal comprising a shared key registered in a server in connection with the electronic device, seed information assigned to the electronic device by the server, and first time information indicating a reference time of the server, wherein the shared key is registered in the server by the first external device, and wherein the seed information and the first time information are generated by the server and transmitted to the first external device;
calculate second time information indicating a difference between the first time information and a current time counted based on the first time information;
generate an aging counter based on the second time information and a designated time period;
generate an advertising packet comprising at least one of a privacy Identification (ID), the aging counter, and signature information based on the first signal; and
broadcast the generated advertising packet by using the wireless communication circuit,
wherein the privacy ID and the aging counter are generated at each designated time period, and
wherein the privacy ID and the aging counter are changed at every designated time point.

2. The electronic device of claim 1, wherein the instructions, when executed by the at least one processor, further cause the electronic device to add the generated aging counter to an aging counter field of the advertising packet.

3. The electronic device of claim 1, wherein the wireless connection is based on a Bluetooth Low Energy (BLE) communication standard.

4. An electronic device comprising:
a wireless communication circuit;
at least one processor; and
memory storing instructions which, when executed by the at least one processor, cause the electronic device to:
establish a wireless connection with a first external device and control the wireless communication circuit to receive a first signal from the first external device through the wireless connection, the first signal comprising a shared key registered in a server in connection with the electronic device, seed information assigned to the electronic device by the server, and first time information indicating a reference time of the server;
calculate, by using the shared key, a private key for generating a privacy identification (ID) and a signature key for authenticating an advertising packet, and store the private key and the signature key in the memory;
generate a first string by combining a random number and the seed information;

generate the privacy ID by encrypting the first string using the private key;

generate the advertising packet comprising at least one of the privacy ID, an aging counter, and signature information based on the first signal;

add at least a part of the encrypted first string to a privacy ID field of the advertising packet; and broadcast the advertising packet by using the wireless communication circuit.

5. The electronic device of claim 4, wherein the instructions, when executed by the at least one processor, further cause the electronic device to apply a modular arithmetic to the random number using a size of a privacy ID generation pool.

6. An electronic device comprising:

a wireless communication circuit;

at least one processor; and memory storing instructions which, when executed by the at least one processor, cause the electronic device to:

establish a wireless connection with a first external device and control the wireless communication circuit to receive a first signal from the first external device through the wireless connection, the first signal comprising a shared key registered in a server in connection with the electronic device, seed information assigned to the electronic device by the server, and first time information indicating a reference time of the server;

calculate, by using the shared key, a private key for generating a privacy identification (ID) and a signature key for authenticating an advertising packet, and store the private key and the signature key in the memory;

generate a packet comprising the privacy ID and an aging counter;

encrypt data of the packet with the signature key to generate signature information;

generate the advertising packet comprising at least one of the privacy ID, the aging counter, and the signature information based on the first signal; and add at least a part of the data encrypted with the signature key to a signature information field of the advertising packet; and broadcast the advertising packet by using the wireless communication circuit.

7. A method comprising:

establishing a wireless connection with a first external device;

receiving a first signal from the first external device through the wireless connection, the first signal including a shared key which is registered in a server in connection with an electronic device, seed information assigned to the electronic device by the server, and first time information indicating a reference time of the server, the shared key is registered in the server by the first external device, and the seed information and the first time information are generated by the server and transmitted to the first external device;

calculating second time information indicating a difference between the first time information and a current time counted based on the first time information;

generating an aging counter based on the second time information and a designated time period;

generating an advertising packet including at least one of a privacy ID, the aging counter, and signature information based on the first signal; and broadcasting the generated advertising packet, wherein the privacy ID and the aging counter are generated at each designated time period, and wherein the privacy ID and the aging counter are changed at every designated time point.

8. The method of claim 7, wherein the generating the advertising packet comprises adding the generated aging counter to an aging counter field of the advertising packet.

9. A method comprising:

establishing a wireless connection with a first external device;

receiving a first signal from the first external device through the wireless connection, the first signal including a shared key which is registered in a server in connection with an electronic device, seed information assigned to the electronic device by the server, and first time information indicating a reference time of the server;

calculating a private key for generating a privacy ID and a signature key for authenticating an advertising packet, and storing the private key and the signature key in a memory;

generating a first string by combining a random number and the seed information;

generating the privacy ID by encrypting the first string using the private key;

generating the advertising packet comprising at least one of the privacy ID, an aging counter, and signature information based on the first signal;

adding at least a part of the encrypted first string to a privacy ID field of the advertising packet; and broadcasting the advertising packet.

10. The method of claim 9, wherein the generating the first string comprises:

obtaining a value by applying a modular arithmetic to the random number using a size of a privacy ID generation pool; and combining the seed information with the obtained value.

11. A method comprising:

establishing a wireless connection with a first external device;

receiving a first signal from the first external device through the wireless connection, the first signal including a shared key which is registered in a server in connection with an electronic device, seed information assigned to the electronic device by the server, and first time information indicating a reference time of the server;

calculating a private key for generating a privacy ID and a signature key for authenticating an advertising packet, and storing the private key and the signature key in a memory;

generating a packet including the privacy ID and an aging counter;

encrypting data of the packet with the signature key to generate a signature information;

generating the advertising packet comprising at least one of the privacy ID, the aging counter, and the signature information based on the first signal;

adding at least a part of the data encrypted with the signature key to a signature information field of the advertising packet; and broadcasting the advertising packet.

* * * * *